(12) United States Patent
Clarke

(10) Patent No.: US 7,792,874 B1
(45) Date of Patent: Sep. 7, 2010

(54) DYNAMIC PROVISIONING FOR FILTERING AND CONSOLIDATING EVENTS

(75) Inventor: James B. Clarke, Sanford, FL (US)

(73) Assignee: Oracle America, Inc., Redwood City, CA (US)

(*) Notice: Subject to any disclaimer, the term of this patent is extended or adjusted under 35 U.S.C. 154(b) by 540 days.

(21) Appl. No.: 11/146,120

(22) Filed: Jun. 7, 2005

Related U.S. Application Data

(63) Continuation-in-part of application No. 10/767,345, filed on Jan. 30, 2004.

(51) Int. Cl.
*G06F 7/00* (2006.01)

(52) U.S. Cl. .................................. 707/803; 707/705

(58) Field of Classification Search .............. None
See application file for complete search history.

(56) References Cited

U.S. PATENT DOCUMENTS

| | | | |
|---|---|---|---|
| 3,449,669 A | 6/1969 | Granqvist | |
| 4,430,699 A | 2/1984 | Segarra et al. | |
| 4,491,946 A | 1/1985 | Kryskow, Jr. et al. | |
| 4,558,413 A | 12/1985 | Schmidt et al. | |
| 4,567,359 A | 1/1986 | Lockwood | |
| 4,713,806 A | 12/1987 | Oberlander et al. | |
| 4,800,488 A | 1/1989 | Agrawal et al. | |
| 4,809,160 A | 2/1989 | Mahon et al. | |
| 4,819,233 A | 4/1989 | Delucia et al. | |
| 4,823,122 A | 4/1989 | Mann et al. | |
| 4,939,638 A | 7/1990 | Stephenson et al. | |
| 4,956,773 A | 9/1990 | Saito et al. | |
| 4,992,940 A | 2/1991 | Dworkin | |
| 5,088,036 A | 2/1992 | Ellis et al. | |
| 5,101,346 A | 3/1992 | Ohtsuki | |
| 5,109,486 A | 4/1992 | Seymour | |
| 5,187,787 A | 2/1993 | Skeen et al. | |
| 5,218,699 A | 6/1993 | Brandle et al. | |
| 5,253,165 A | 10/1993 | Leiseca et al. | |
| 5,257,369 A | 10/1993 | Skeen et al. | |
| 5,293,614 A | 3/1994 | Ferguson et al. | |
| 5,297,283 A | 3/1994 | Kelly, Jr. et al. | |

(Continued)

FOREIGN PATENT DOCUMENTS

EP  0 300 516 A2  1/1989

(Continued)

OTHER PUBLICATIONS

"Consumers Can View, Share Picture On-Line as Kodak Picture Network Goes 'Live'," Business Wire, Aug. 25, 1997, pp. 18-19.

(Continued)

*Primary Examiner*—Don Wong
*Assistant Examiner*—Shyue Jiunn Hwa
(74) *Attorney, Agent, or Firm*—Marsh Fischmann & Breyfogle LLP; Kent A. Lembke; Ronald J. Ward

(57) ABSTRACT

Systems and methods provide identification services over a distributed network. Systems and methods provide the tools to receive data from reader devices, process the received data, and provide the processed data to users. Enhanced event handling and dynamic service provisioning enable robust and flexible deployment of identification services in a distributed network.

27 Claims, 15 Drawing Sheets

U.S. PATENT DOCUMENTS

| | | |
|---|---|---|
| 5,303,042 A | 4/1994 | Lewis et al. |
| 5,307,490 A | 4/1994 | Davidson et al. |
| 5,311,591 A | 5/1994 | Fischer |
| 5,319,542 A | 6/1994 | King, Jr. et al. |
| 5,327,559 A | 7/1994 | Priven et al. |
| 5,339,430 A | 8/1994 | Lundin et al. |
| 5,339,435 A | 8/1994 | Lubkin et al. |
| 5,341,477 A | 8/1994 | Pitkin et al. |
| 5,386,568 A | 1/1995 | Wold et al. |
| 5,390,328 A | 2/1995 | Frey et al. |
| 5,392,280 A | 2/1995 | Zheng |
| 5,423,042 A | 6/1995 | Jalili et al. |
| 5,440,744 A | 8/1995 | Jacobson et al. |
| 5,446,901 A | 8/1995 | Owicki et al. |
| 5,448,740 A | 9/1995 | Kiri et al. |
| 5,452,459 A | 9/1995 | Drury et al. |
| 5,455,952 A | 10/1995 | Gjovaag |
| 5,459,837 A | 10/1995 | Caccavale |
| 5,471,629 A | 11/1995 | Risch |
| 5,475,792 A | 12/1995 | Stanford et al. |
| 5,475,817 A | 12/1995 | Waldo et al. |
| 5,475,840 A | 12/1995 | Nelson et al. |
| 5,481,721 A | 1/1996 | Serlet et al. |
| 5,491,791 A | 2/1996 | Glowny et al. |
| 5,504,921 A | 4/1996 | Dev et al. |
| 5,506,984 A | 4/1996 | Miller |
| 5,511,196 A | 4/1996 | Shackelford et al. |
| 5,511,197 A | 4/1996 | Hill et al. |
| 5,524,244 A | 6/1996 | Robinson et al. |
| 5,544,040 A | 8/1996 | Gerbaulet |
| 5,548,724 A | 8/1996 | Akizawa et al. |
| 5,548,726 A | 8/1996 | Pettus |
| 5,553,282 A | 9/1996 | Parrish et al. |
| 5,555,367 A | 9/1996 | Premerlani et al. |
| 5,555,427 A | 9/1996 | Aoe et al. |
| 5,557,798 A | 9/1996 | Skeen et al. |
| 5,560,003 A | 9/1996 | Nilsen et al. |
| 5,561,785 A | 10/1996 | Blandy et al. |
| 5,577,231 A | 11/1996 | Scalzi et al. |
| 5,592,375 A | 1/1997 | Salmon et al. |
| 5,594,921 A | 1/1997 | Pettus |
| 5,603,031 A | 2/1997 | White et al. |
| 5,617,537 A | 4/1997 | Yamada et al. |
| 5,628,005 A | 5/1997 | Hurvig |
| 5,640,564 A | 6/1997 | Hamilton et al. |
| 5,644,720 A | 7/1997 | Boll et al. |
| 5,644,768 A | 7/1997 | Periwal et al. |
| 5,652,888 A | 7/1997 | Burgess |
| 5,655,148 A | 8/1997 | Richman et al. |
| 5,659,751 A | 8/1997 | Heninger |
| 5,664,110 A | 9/1997 | Green et al. |
| 5,664,111 A | 9/1997 | Nahan et al. |
| 5,664,191 A | 9/1997 | Davidson et al. |
| 5,666,493 A | 9/1997 | Wojcik et al. |
| 5,671,225 A | 9/1997 | Hooper et al. |
| 5,671,279 A | 9/1997 | Elgamal |
| 5,674,982 A | 10/1997 | Greve et al. |
| 5,675,796 A | 10/1997 | Hodges et al. |
| 5,675,797 A | 10/1997 | Chung et al. |
| 5,680,573 A | 10/1997 | Rubin et al. |
| 5,680,617 A | 10/1997 | Gough et al. |
| 5,682,534 A | 10/1997 | Kapoor et al. |
| 5,684,955 A | 11/1997 | Meyer et al. |
| 5,689,709 A | 11/1997 | Corbett et al. |
| 5,694,551 A | 12/1997 | Doyle et al. |
| 5,706,435 A | 1/1998 | Barbara et al. |
| 5,706,502 A | 1/1998 | Foley et al. |
| 5,710,887 A | 1/1998 | Chelliah et al. |
| 5,715,314 A | 2/1998 | Payne et al. |
| 5,721,825 A * | 2/1998 | Lawson et al. .............. 709/203 |
| 5,721,832 A | 2/1998 | Westrope et al. |
| 5,724,540 A | 3/1998 | Kametani |
| 5,724,588 A | 3/1998 | Hill et al. |
| 5,727,048 A | 3/1998 | Hiroshima et al. |
| 5,727,145 A | 3/1998 | Nessett et al. |
| 5,729,594 A | 3/1998 | Klingman |
| 5,734,706 A | 3/1998 | Windsor et al. |
| 5,737,607 A | 4/1998 | Hamilton et al. |
| 5,742,768 A | 4/1998 | Gennaro et al. |
| 5,745,678 A | 4/1998 | Herzberg et al. |
| 5,745,695 A | 4/1998 | Gilchrist et al. |
| 5,745,703 A | 4/1998 | Cejtin et al. |
| 5,745,755 A | 4/1998 | Covey |
| 5,748,897 A | 5/1998 | Katiyar |
| 5,754,849 A | 5/1998 | Dyer et al. |
| 5,754,977 A | 5/1998 | Gardner et al. |
| 5,757,925 A | 5/1998 | Faybishenko |
| 5,758,077 A | 5/1998 | Danahy et al. |
| 5,758,328 A | 5/1998 | Giovannoli |
| 5,758,344 A | 5/1998 | Prasad et al. |
| 5,761,507 A | 6/1998 | Govett |
| 5,761,656 A | 6/1998 | Ben-Shachar |
| 5,764,897 A | 6/1998 | Khalidi |
| 5,764,915 A | 6/1998 | Heimsoth et al. |
| 5,764,982 A | 6/1998 | Madduri |
| 5,768,532 A | 6/1998 | Megerian |
| 5,774,551 A | 6/1998 | Wu et al. |
| 5,774,729 A | 6/1998 | Carney et al. |
| 5,778,179 A | 7/1998 | Kanai et al. |
| 5,778,187 A | 7/1998 | Monteiro et al. |
| 5,778,228 A | 7/1998 | Wei |
| 5,778,368 A | 7/1998 | Hogan et al. |
| 5,784,560 A | 7/1998 | Kingdon et al. |
| 5,787,425 A | 7/1998 | Bigus |
| 5,787,431 A | 7/1998 | Shaughnessy |
| 5,790,548 A | 8/1998 | Sistanizadeh et al. |
| 5,790,677 A | 8/1998 | Fox et al. |
| 5,794,207 A | 8/1998 | Walker et al. |
| 5,799,173 A | 8/1998 | Gossler et al. |
| 5,802,367 A | 9/1998 | Held et al. |
| 5,805,805 A | 9/1998 | Civanlar et al. |
| 5,806,042 A | 9/1998 | Kelly et al. |
| 5,808,911 A | 9/1998 | Tucker et al. |
| 5,809,144 A | 9/1998 | Sirbu et al. |
| 5,809,507 A | 9/1998 | Cavanaugh, III |
| 5,812,819 A | 9/1998 | Rodwin et al. |
| 5,813,013 A | 9/1998 | Shakib et al. |
| 5,815,149 A | 9/1998 | Mutschler, III et al. |
| 5,815,709 A | 9/1998 | Waldo et al. |
| 5,815,711 A | 9/1998 | Sakamoto et al. |
| 5,818,448 A | 10/1998 | Katiyar |
| 5,829,022 A | 10/1998 | Watanabe et al. |
| 5,832,219 A | 11/1998 | Pettus |
| 5,832,529 A | 11/1998 | Wollrath et al. |
| 5,832,593 A | 11/1998 | Wurst et al. |
| 5,835,737 A | 11/1998 | Sand et al. |
| 5,842,018 A | 11/1998 | Atkinson et al. |
| 5,844,553 A | 12/1998 | Hao et al. |
| 5,845,090 A | 12/1998 | Collins, III et al. |
| 5,845,129 A | 12/1998 | Wendorf et al. |
| 5,850,442 A | 12/1998 | Muftic |
| 5,860,004 A | 1/1999 | Fowlow et al. |
| 5,860,153 A | 1/1999 | Matena et al. |
| 5,864,862 A | 1/1999 | Kriens et al. |
| 5,864,866 A | 1/1999 | Henckel et al. |
| 5,872,928 A | 2/1999 | Lewis et al. |
| 5,872,973 A | 2/1999 | Mitchell et al. |
| 5,875,335 A | 2/1999 | Beard |
| 5,878,411 A | 3/1999 | Burroughs et al. |
| 5,884,024 A | 3/1999 | Lim et al. |
| 5,884,079 A | 3/1999 | Furusawa |
| 5,887,134 A | 3/1999 | Ebrahim |
| 5,887,172 A | 3/1999 | Vasudevan et al. |
| 5,889,951 A | 3/1999 | Lombardi |

| | | |
|---|---|---|
| 5,889,988 A | 3/1999 | Held |
| 5,890,158 A | 3/1999 | House et al. |
| 5,892,904 A | 4/1999 | Atkinson et al. |
| 5,905,868 A | 5/1999 | Baghai et al. |
| 5,913,029 A | 6/1999 | Shostak |
| 5,915,112 A | 6/1999 | Boutcher |
| 5,925,108 A | 7/1999 | Johnson et al. |
| 5,933,497 A | 8/1999 | Beetcher et al. |
| 5,933,647 A | 8/1999 | Aronberg et al. |
| 5,935,249 A | 8/1999 | Stern et al. |
| 5,940,827 A | 8/1999 | Hapner et al. |
| 5,944,793 A | 8/1999 | Islam et al. |
| 5,946,485 A | 8/1999 | Weeren et al. |
| 5,946,694 A | 8/1999 | Copeland et al. |
| 5,949,998 A | 9/1999 | Fowlow et al. |
| 5,951,652 A | 9/1999 | Ingrassia, Jr. et al. |
| 5,956,509 A | 9/1999 | Kevner |
| 5,960,404 A | 9/1999 | Chaar et al. |
| 5,961,582 A | 10/1999 | Gaines |
| 5,963,924 A | 10/1999 | Williams et al. |
| 5,963,947 A | 10/1999 | Ford et al. |
| 5,966,435 A | 10/1999 | Pino |
| 5,966,531 A | 10/1999 | Skeen et al. |
| 5,969,967 A | 10/1999 | Aahlad et al. |
| 5,974,201 A | 10/1999 | Chang et al. |
| 5,978,484 A | 11/1999 | Apperson et al. |
| 5,978,773 A | 11/1999 | Hudetz et al. |
| 5,982,773 A | 11/1999 | Nishimura et al. |
| 5,987,506 A | 11/1999 | Carter et al. |
| 5,991,808 A | 11/1999 | Broder et al. |
| 5,996,075 A | 11/1999 | Matena |
| 5,999,179 A | 12/1999 | Kekic et al. |
| 5,999,988 A | 12/1999 | Pelegri-Llopart et al. |
| 6,003,050 A | 12/1999 | Silver et al. |
| 6,003,065 A | 12/1999 | Yan et al. |
| 6,003,763 A | 12/1999 | Gallagher et al. |
| 6,009,103 A | 12/1999 | Woundy |
| 6,009,413 A | 12/1999 | Webber et al. |
| 6,009,464 A | 12/1999 | Hamilton et al. |
| 6,014,686 A | 1/2000 | Elnozahy et al. |
| 6,016,496 A | 1/2000 | Roberson |
| 6,016,516 A | 1/2000 | Horikiri |
| 6,018,619 A | 1/2000 | Allard et al. |
| 6,023,586 A | 2/2000 | Gaisford et al. |
| 6,026,414 A | 2/2000 | Anglin |
| 6,031,977 A | 2/2000 | Pettus |
| 6,032,151 A | 2/2000 | Arnold et al. |
| 6,034,925 A | 3/2000 | Wehmeyer |
| 6,041,351 A | 3/2000 | Kho |
| 6,044,381 A | 3/2000 | Boothby et al. |
| 6,052,761 A | 4/2000 | Hornung et al. |
| 6,055,562 A | 4/2000 | Devarakonda et al. |
| 6,058,381 A | 5/2000 | Nelson |
| 6,058,383 A | 5/2000 | Narasimhalu et al. |
| 6,061,699 A | 5/2000 | DiCecco et al. |
| 6,061,713 A | 5/2000 | Bharadhwaj |
| 6,067,575 A | 5/2000 | McManis et al. |
| 6,078,655 A | 6/2000 | Fahrer et al. |
| 6,085,030 A | 7/2000 | Whitehead et al. |
| 6,085,255 A | 7/2000 | Vincent et al. |
| 6,092,194 A | 7/2000 | Touboul |
| 6,093,216 A | 7/2000 | Adl-Tabatabai et al. |
| 6,101,528 A | 8/2000 | Butt |
| 6,104,716 A | 8/2000 | Crichton et al. |
| 6,108,346 A | 8/2000 | Doucette et al. |
| 6,134,603 A | 10/2000 | Jones et al. |
| 6,154,844 A | 11/2000 | Touboul et al. |
| 6,157,960 A | 12/2000 | Kaminsky et al. |
| 6,182,083 B1 | 1/2001 | Scheifler et al. |
| 6,185,602 B1 | 2/2001 | Bayrakeri |
| 6,185,611 B1 | 2/2001 | Waldo et al. |
| 6,189,046 B1 | 2/2001 | Moore et al. |
| 6,192,044 B1 | 2/2001 | Mack |

| | | | |
|---|---|---|---|
| 6,199,068 B1 | 3/2001 | Carpenter | |
| 6,199,116 B1 | 3/2001 | May et al. | |
| 6,212,578 B1 | 4/2001 | Racicot et al. | |
| 6,216,138 B1 | 4/2001 | Wells et al. | |
| 6,216,158 B1 | 4/2001 | Luo et al. | |
| 6,219,675 B1 | 4/2001 | Pal et al. | |
| 6,226,746 B1 | 5/2001 | Scheifler | |
| 6,243,716 B1 | 6/2001 | Waldo et al. | |
| 6,243,814 B1 | 6/2001 | Matena | |
| 6,247,091 B1 | 6/2001 | Lovett | |
| 6,253,256 B1 | 6/2001 | Wollrath et al. | |
| 6,263,350 B1 | 7/2001 | Wollrath et al. | |
| 6,263,379 B1 | 7/2001 | Atkinson et al. | |
| 6,269,401 B1 | 7/2001 | Fletcher et al. | |
| 6,272,559 B1 | 8/2001 | Jones et al. | |
| 6,282,295 B1 | 8/2001 | Young et al. | |
| 6,282,568 B1 | 8/2001 | Sondur et al. | |
| 6,282,581 B1 | 8/2001 | Moore et al. | |
| 6,292,934 B1 | 9/2001 | Davidson et al. | |
| 6,301,613 B1 | 10/2001 | Ahlstrom et al. | |
| 6,321,275 B1 | 11/2001 | McQuistan et al. | |
| 6,327,677 B1 | 12/2001 | Garg et al. | |
| 6,339,783 B1 | 1/2002 | Horikiri | |
| 6,343,308 B1 | 1/2002 | Marchesseault | |
| 6,351,735 B1 | 2/2002 | Deaton et al. | |
| 6,360,266 B1 | 3/2002 | Pettus | |
| 6,363,409 B1 | 3/2002 | Hart et al. | |
| 6,378,001 B1 | 4/2002 | Aditham et al. | |
| 6,385,643 B1 | 5/2002 | Jacobs et al. | |
| 6,408,342 B1 | 6/2002 | Moore et al. | |
| 6,418,468 B1 | 7/2002 | Ahlstrom et al. | |
| 6,505,248 B1 | 1/2003 | Casper et al. | |
| 6,564,174 B1 | 5/2003 | Ding et al. | |
| 6,578,074 B1 | 6/2003 | Bahlmann | |
| 6,603,772 B1 | 8/2003 | Moussavi et al. | |
| 6,604,127 B2 | 8/2003 | Murphy et al. | |
| 6,604,140 B1 | 8/2003 | Beck et al. | |
| 6,654,793 B1 | 11/2003 | Wollrath et al. | |
| 6,704,803 B2 | 3/2004 | Wilson et al. | |
| 6,757,262 B1 | 6/2004 | Weisshaar et al. | |
| 6,757,729 B1 | 6/2004 | Devarakonda et al. | |
| 6,801,940 B1 | 10/2004 | Moran et al. | |
| 6,801,949 B1 | 10/2004 | Bruck et al. | |
| 6,804,711 B1 | 10/2004 | Dugan et al. | |
| 6,804,714 B1 | 10/2004 | Tummalapalli | |
| 6,988,134 B2 * | 1/2006 | Thorpe et al. | 709/223 |
| 7,075,412 B1 * | 7/2006 | Reynolds et al. | 340/10.2 |
| 7,123,608 B1 * | 10/2006 | Scott et al. | 370/353 |
| 7,139,821 B1 * | 11/2006 | Shah et al. | 709/224 |
| 7,263,597 B2 * | 8/2007 | Everdell et al. | 712/11 |
| 2001/0003824 A1 | 6/2001 | Schnier | |
| 2001/0011350 A1 | 8/2001 | Zabetian | |
| 2002/0059212 A1 | 5/2002 | Takagi | |
| 2002/0073019 A1 | 6/2002 | Deaton | |
| 2002/0111814 A1 | 8/2002 | Barnett et al. | |
| 2003/0005132 A1 | 1/2003 | Nguyen et al. | |
| 2003/0033280 A1 * | 2/2003 | Van Den Hamer et al. | 707/1 |
| 2003/0051029 A1 * | 3/2003 | Reedy et al. | 709/224 |
| 2003/0051030 A1 * | 3/2003 | Clarke et al. | 709/224 |
| 2003/0084204 A1 | 5/2003 | Wollrath et al. | |
| 2003/0155415 A1 * | 8/2003 | Markham et al. | 235/376 |
| 2003/0191984 A1 | 10/2003 | Flaherty et al. | |
| 2004/0263319 A1 * | 12/2004 | Huomo | 340/10.2 |
| 2004/0267876 A1 * | 12/2004 | Kakivaya et al. | 709/200 |

FOREIGN PATENT DOCUMENTS

| | | |
|---|---|---|
| EP | 0 351 536 A3 | 1/1990 |
| EP | 0 384 339 A3 | 8/1990 |
| EP | 0 472 874 A1 | 3/1992 |
| EP | 0 474 340 A2 | 3/1992 |
| EP | 497 022 A1 | 8/1992 |
| EP | 0 555 997 A2 | 8/1993 |

| | | |
|---|---|---|
| EP | 0 565 849 A2 | 10/1993 |
| EP | 0 569 195 A3 | 11/1993 |
| EP | 0 625 750 A2 | 11/1994 |
| EP | 0 635 792 A2 | 1/1995 |
| EP | 0 651 328 A1 | 5/1995 |
| EP | 0 660 231 A2 | 6/1995 |
| EP | 0 697 655 A2 | 2/1996 |
| EP | 0 718 761 A1 | 6/1996 |
| EP | 0 767 432 A2 | 4/1997 |
| EP | 0 778 520 A2 | 6/1997 |
| EP | 0 794 493 A2 | 9/1997 |
| EP | 0 803 810 A2 | 10/1997 |
| EP | 0 803 811 A2 | 10/1997 |
| EP | 0 805 393 A2 | 11/1997 |
| EP | 0 810 524 A1 | 12/1997 |
| EP | 0 817 020 A2 | 1/1998 |
| EP | 0 817 022 A2 | 1/1998 |
| EP | 0 817 025 A2 | 1/1998 |
| EP | 0 836 140 A2 | 4/1998 |
| GB | 2 253 079 A | 8/1992 |
| GB | 2 262 825 A | 6/1993 |
| GB | 2 305 087 A | 3/1997 |
| JP | 11-45187 | 2/1999 |
| WO | WO92/07335 | 4/1992 |
| WO | WO92/09948 | 6/1992 |
| WO | WO93/25962 A1 | 12/1993 |
| WO | WO94/03855 | 2/1994 |
| WO | WO96/03692 | 2/1996 |
| WO | WO96/10787 | 4/1996 |
| WO | WO96/18947 | 6/1996 |
| WO | WO96/24099 | 8/1996 |
| WO | WO98/02814 | 1/1998 |
| WO | WO98/04971 | 2/1998 |
| WO | WO99/17194 | 4/1999 |
| WO | WO01-13228 A2 | 2/2001 |
| WO | WO01/86394 A2 | 11/2001 |
| WO | WO01/90903 A1 | 11/2001 |

OTHER PUBLICATIONS

"Eden Project Proposal," Department of Computer Science, University of Washington, Oct. 1980, Technical Report #80-10-01, cover and Foreword.
"ISN Dataweb Sells Software, Hardware," Datamation, Apr. 1, 1996, p. 40.
"Java (TM) Object Serialization Specification", Sun Microsystems, Inc., XP-002242372, <www.dei.estg.iplei.pt/P3/N/material/extra/serial-spec-JDK1_2.pdf>, 1998.
"Java (TM) Remote Method Invocation Specification," Sun Microsystems, Inc., <java.sun.com/products/jdk1.2beta1>, 1997.
"Java.io ObjectInputStream", XP-002243027, <java.sun.com/products/jdk/1.1/docs/guide/serialization/spec>, 1998, p. 1230-1232, 1263-1264 & 1283.
"Kodak DC220 and DC260 Digital Cameras Are Shipping to Retailers Across the Country Cameras Are Optimized for USB Interface Supported in Windows 98," Business Wire, Jun. 24, 1998, pp. 42-44.
"Kodak demonstrates leadership across entire photographic category," M2 Presswire, Feb. 13, 1998, pp. 31-35.
"Kodak PhotoNet Online Makes It a Snap to Share Summer Photos," PR Newswire, Jul. 2, 1998, pp. 63-64.
"Kodak Picture Network Sends Prints Home From the Holidays," Business Wire, Dec. 29, 1997, pp. 58-60.
"Photo processing made easy on the Internet; Storm Software and PictureVision team up with Konica Corp.," Business Wire, Feb. 22, 1996, pp. 3-4.
"Seeing your photos a whole new way," Business Wire, Dec. 12, 1996, pp. 9-10.
"Transparent Network Computing," Locus Computing Corporation, Jan. 5, 1995.
"Webwatch: MCI Announces Internet Access,", Boardwatch Magazine, Jan. 1995.
Administrator's Guide, Netscape Enterprise Server, Version 3.0, Netscape Communications Corp., 1998.

Agha et al., "Actorspaces: An Open Distributed Programming Paradigm," University of Illinois, Report No. UIUCDCS-R-92-1766, Open Systems Laboratory TR No. 8, pp. 1-12, Nov. 1992.
Ahmed et al., "A Program Building Tool for Parallel Applications," Yale University, pp. 1-23, Dec. 1, 1993.
Aldrich et al., "Providing Easier Access to Remote Objects in Client-Server Systems," System Sciences, 1998, Proceedings of the 31st Hawaii Internat'l. Conference, Jan. 6-9, 1998, pp. 366-375.
Aldrich et al., "Providing Easier Access to Remote Objects in Distributed Systems," Calif. Institute of Technology, www.cs.caltech.edu/%7Ejedi/paper/jedipaper.html, Nov. 21, 1997.
Alexander et al., "Active Bridging," Proceedings of the ACM/SIGCOMM'97 Conference, Cannes, France, Sep. 1997.
Almes et al., "Edmas: A Locally Distributed Mail System," Department of Computer Science, University of Washington, Technical Report 83-07-01, Jul. 7, 1983, Abstract & pp. 1-17.
Almes et al., "Research in Integrated Distributed Computing," Department of Computer Science, University of Washington, Oct. 1979, pp. 1-42.
Almes et al., "The Eden System: A Technical Review," Department of Computer Science, University of Washington, Technical Report 83-10-05, Oct. 1983, pp. 1-25.
Almes, "Integration and Distribution in the Eden System," Department of Computer Science, University of Washington, Technical Report 83-01-02, Jan. 19, 1983, pp. 1-18 & Abstract.
Almes, "The Evolution of the Eden Invocation Mechanism," Department of Computer Science, University of Washington, Technical Report 83-01-03, Jan. 19, 1983, pp. 1-14 & Abstract.
Amitabh et al., Proxies, Application Interfaces, and Distributed Systems, IEEE, pp. 212-220, 1992.
Anderson et al., "Persistent Linda: Linda + Transactions + Query Processing," Proceedings of the 13th Symposium on Fault Tolerant Systems, pp. 93-109, 1991.
Anonymous, "Change-Notification Service for Shared Files," IBM Technical Disclosure Bulletin, vol. 36, No. 8, pp. 77-82, XP002108713, New York, US, Aug. 1993.
Anonymous, "Resource Preemption for Priority Scheduling," IBM Technical Disclosure Bulletin, vol. 16, No. 6, p. 1931, XP002109435 New York, US, Nov. 1973.
Arnold, Ken, "The Jini Architecture: Dynamic Services in a Flexible Network," Sun Microsystems, Inc., Proceedings of the 36th ACM IEEE Design Automation Conference, Jun. 1999, pp. 157-162.
Auto-ID Center, "Auto-ID Savant Specification 1.0," Version of Oct. 13, 2003 (58 pages).
Bandrowski, "Stores Without Doors: Kiosks Generate New Profits," Corporate Computing, Oct. 1992, pp. 193-195.
Beech et al., "Object Databases as Generalizations of Relational Databases," Computer Standards & Interfaces, vol. 13, Nos. 1/3, pp. 221-230, Amsterdam, NL, Jan. 1991.
Begole et al., "Transparent Sharing of Java Applets: A Replicated Approach," Oct. 1997, pp. 55-65.
Bertino et al., "Object-Oriented Database Management Systems: Concepts and Issues," Computer, vol. 24, No. 4, pp. 33-47, Los Alamitos, CA, Apr. 1991.
Betz et al., "Interoperable Objects: Laying the Foundation for Distributed Object Computing," Dr. Dobb's Journal, vol. 19, No. 11, p. 18(13), Oct. 1994.
Bevan et al., "An Efficient Reference Counting Solution to the Distributed Garbage Collection Problem," Parallel Computing, NL, Elsevier Science Publishers, Amsterdam, vol. 9, No. 2, pp. 179-192, Jan. 1989.
Birrell et al., "Distributed Garbage Collection for Network Objects," Digital Systems Research Center, No. 116, pp. 1-18, Dec. 15, 1993.
Birrell et al., "Grapevine: An Exercise in Distributed Computing," Communications of the ACM, vol. 25, No. 4, pp. 260-274, Apr. 1982.
Birrell et al., "Implementing Remote Procedure Calls," ACM Transactions on Computer Systems, vol. 2, No. 1, pp. 39-59, Feb. 1984.
Birrell et al., "Network Objects," DEC SRC Research Report 115, Feb. 28, 1994.
Birrell et al., "Network Objects," Operating Systems Review, 27(5), pp. 217-230, Dec. 1993.

Black et al., "A Language for Distributed Programming," Department of Computer Science, University of Washington, Technical Report 86-02-03, Feb. 1986, p. 10.

Black et al., "Distribution and Abstract Types in Emerald," University of Washington, Technical Report No. 85-08-05, Aug. 1985, pp. 1-10.

Black et al., "Object Structure in the Emerald System," University of Washington, Technical Report 86-04-03, Apr. 1986, pp. 1-14.

Black et al., "The Eden Project: A Final Report," Department of Computer Science, University of Washington, Technical Report 86-11-01, Nov. 1986, pp. 1-28.

Black, "Supporting Distributed Applications: Experience with Eden," Department of Computer Science, University of Washington, Technical Report 85-03-02, Mar. 1985, pp. 1-21.

Black, "The Eden Programming Language," Department of Computer Science, FR-35, University of Washington, Technical Report 85-09-01, Sep. 1985 (Revised Dec. 1985), pp. 1-19.

Black, "The Eden Project: Overview and Experiences," Department of Computer Science, University of Washington, EUUG, Autumn '86 Conference Proceedings, Manchester, UK, Sep. 22-25, 1986, pp. 177-189.

Braine et al., "Object-Flow," 1997, pp. 418-419.

Bruno, "Working the Web," Data Communications, Apr. 1997, pp. 50-60.

Burns et al., "An Analytical Study of Opportunistic Lease Renewal," Distributed Computing Systems, 21st International Conference, pp. 146-153, Apr. 2000.

Cannon et al., "Adding Fault-Tolerant Transaction Processing to LINDA," Software-Practice and Experience, vol. 24(5), pp. 449-466, May 1994.

Cardelli, "Obliq, A Lightweight Language for Network Objects," Digital SRC, pp. 1-37, Nov. 5, 1993.

Carriero et al., "Distributed Data Structures in Linda," Principles of Programming Language, pp. 1-16,1986.

Carriero et al., "Distributed Data Structures in Linda," Yale Research Report YALEU/DCS/RR-438, Nov. 1985.

Cary G. Gray and David R. Cheriton, "Leases: An Efficient Fault-Tolerant Mechanism for Distributed File Cache Consistency", 1989, ACM, pp. 202-210.

Chung et al., "A 'Tiny' Pascal Compiler: Part 1: The P-Code Interpreter," Byte Publications, Inc., Sep. 1978.

Chung et al., "A 'Tiny' Pascal Compiler: Part 2: The P-Compiler," Byte Publications, Inc., Oct. 1978.

Ciancarini et al., "Coordinating Distributed Applets with Shade/Java," Feb. 1998, pp. 130-138.

Cohen, "Electronic Commerce," USC/Information Sciences Institute, Oct. 1989.

Conhaim, "Online shopping: a beginner's guide; includes related listing of videotex services," Link-Up, vol. 5, No. 6, p. 32, Nov. 1988.

Coulouris et al., "Distributed Systems Concepts and Designs," Second Ediition, Addison-Wesley, 1994.

Dave et al., "Proxies, Application Interface, and Distributed Systems," Proceedings International Workshop on Object Orientation in Operating Systems, pp. 212-220, Sep. 24, 1992.

Delcambre et al., "Simulation of the Object Flow Model: A Conceptual Modeling Language for Object-Driven Applications," 1993, pp. 216-225.

Design Project #2, Electronic Shopping at MIT, MIT Class 6.033 Handout 23, Massachusetts Institute of Technology, http://web.mit.edu/6.033/1995/handouts/html/h23.html, Spring 1995, pp. 1-6.

Deux et al., "The O2 System," Communications of the Association for Computing Machinery, vol. 34, No. 10, pp. 34-48, Oct. 1, 1991.

Dijkstra, "Self-stabilizing Systems in Spite of Distributed Control," Communications of the ACM, vol. 17, No. 11, pp. 643-644, Nov. 1974.

Dolev et al., "On the Minimal Synchronism Needed for Distributed Consensus," Journal of the ACM, vol. 34, No. 1, pp. 77-97, Jan. 1987.

Dollimore et al., "The Design of a System for Distributing Shared Objects," The Computer Journal, No. 6, Cambridge, GB, Dec. 1991.

Dourish, "A Divergence-Based Model of Synchrony and Distribution in Collaborative Systems," Xerox Technical Report EPC-1194-102, pp. 1-10, 1994.

Drexler et al., "Incentive Engineering for Computational Resource Management," The Ecology of Computation, Elsevier Science Publishers B.V., pp. 231-266, 1988.

Droms, "RFC 1541 Dynamic Host Configuration Protocol," <http://www.cis.ohio-state.edu/htbin/rfc/rfc1541.html>, pp. 1-33, Oct. 1993.

Ellsworth, "Boom Town," Internet World, Jun. 1995, pp. 33-35.

Emms, "A Definition of an Access Control Systems Language," Computer Standards and Interfaces, vol. 6, No. 4, pp. 443-454, Jan. 1, 1987.

Estrin, "Inter-Organization Networks: Implications of Access Control Requirements for Interconnection Protocols," ACM, 1986, pp. 254-263.

Fleisch et al., "High Performance Distributed Objects Using Distributed Shared Memory & Remote Method Invocation," System Sciences, 1998, Proceedings of the 31st Hawaii Internat'l. Conference, Jan. 6-9, 1998, pp. 574-578.

Fleischer, "SkyMall's 'Supplier Network' Takes Flight", Retailtech, The Technology Magazine for Retail Executives, Apr. 1997.

Foley, "Managing Campus-Wide Information Systems: Issues and Problems," Capitalizing on Communication, ACM SIGUCCS XVIII, 1989, pp. 169-174.

Fryxell, "eaasySABRE," Link-Up, May/Jun. 1996, pp. 10-11.

Gardner, "Kodak Follows Startup Into Online Photo Processing Business," Internet World, Sep. 8, 1997, pp. 5-6.

Gelernter et al., "Parallel Programming in Linda," Yale University, pp. 1-21, Jan. 1985.

Gelernter, "Generative Communication in Linda," ACM Transactions on Programming Languages and Systems, vol. 7, No. 1, pp. 80-112, Jan. 1985.

Gogan et al., "Open Market, Inc.: Managing in a Turbulent Environment," Harvard Business School Publishing, Aug. 29, 1996, pp. 1-30.

Goldberg et al., "Smalltalk-80—The Language and its Implementation," Xerox Palo Alto Research Center, 1983 (reprinted with corrections, Jul. 1985), pp. 1-720.

Gosling et al., "The Java (TM) Language Specification," Addison-Wesley, 1996.

Gottlob et al., "Extending Object-Oriented Systems with Roles," ACM Transactions on Information Systems, vol. 14, No. 3, pp. 268-296, Jul. 1996.

Gray et al., "Leases: An Efficient Fault-Tolerant Mechanism for Distributed File Cache Consistency," ACM, pp. 202-210, 1989.

Gray et al., "Leases: An Efficient Fault-Tolerant Mechanism for Distributed File Cache Consistency," Proceedings of the 12th ACM Symposium on Operating Systems Principles, pp. 202-210, 1989.

Guth, "JavaOne: Sun to Expand Java Distributed Computing Effort," <http://www.sunworld.com/swol-02-1998/swol-02-sunspots.html>, XP-002109935, p. 1, Feb. 20, 1998.

Guyennet et al., "A New Consistency Protocol Implemented in the CAIiF System," IEEE, 1094-7256/97, pp. 82-87, 1997.

Guyennet et al., "Distributed Shared Memory Layer for Cooperative Work Applications," IEEE, 0742-1303/97, pp. 72-78, 1997.

H.A. Smith and J.D. McKeen, "Object-Oriented Technology: Getting Beyond the Hype", ACM, Spring 1996, vol. 27, pp. 20-22.

Hamilton et al., "Subcontract: A Flexible Base for Distributed Programming," Proceedings of 14th Symposium of Operating System Principles, Dec. 1993.

Hamilton, "Java and the Shift to Net-Centric Computing," Computer, pp. 31-39, Aug. 1996.

Harris et al., "Proposal for a General Java Proxy Class for Distributed Systems and Other Uses," Netscape Communications Corp., Jun. 25, 1997.

Hartman et al., "Liquid Software: A New Paradigm for Networked Systems," Technical Report 96-11, Department of Comp. Sci., Univ. of Arizona, Jun. 1996.

Hodges, Douglas, "Managing Object Lifetimes in OLE," Aug. 25, 1994, pp. 1-41.

Holman et al., "The Eden Shared Calendar System," Department of Computer Science, FR-35, University of Washington, Technical Report 85-05-02, Jun. 22, 1985, pp. 1-14.

Hoshi et al., "Allocation of the Cross-Connect Function in Leased Circuit Networks," 1992, ICC'92, conference record, Supercomm/ICC '92, A New World of Communications, IEEE International Conference, pp. 1408-1412.

Howard et al., "Scale and Performance in a Distributed File System," ACM Transactions on Computer Systems, vol. 6, No. 1, pp. 51-81, Feb. 1988.

Hsu, "Reimplementing Remote Procedure Calls," University of Washington, Thesis, Mar. 22, 1985, pp. 1-106.

Hunt, "IDF: A Graphical Data Flow Programming Language for Image Processing and Computer Vision," Proceedings of the International Conference on Systems, Man, and Cybernetics, pp. 351-360, Los Angeles, Nov. 4-7, 1990.

Hutchinson, "Emerald: An Object-Based Language for Distributed Programming," a Dissertation, University of Washington, 1987, pp. 1-107.

IBM (TM) Technical Disclosure Bulletin, "Object Location Algorithm," vol. 36, No. 09B, pp. 257-258, Sep. 1993.

IBM (TM) Technical Disclosure Bulletin, "Retrieval of Qualified Variables Using Extendible Hashing," vol. 36, No. 12, pp. 301-303, Dec. 1993.

IBM Technical Disclosure Bulletin, "Local Network Monitoring to Populate Access Agent Directory," vol. 36, No. 09A, pp. 403-405, Sep. 1993.

IBM, "Chapter 6—Distributed SOM (DSOM)," SOMobjects Developer Toolkit Users Guide, Version 2.1, pp. 6-1-6-90, Oct. 1994.

Israel et al., "Authentication in Office System Internetworks," ACM Transactions on Office Information Systems, vol. 1, No. 3, Jul. 1983, pp. 193-210.

Jacob, "The Use of Distributed Objects and Dynamic Interfaces in a Wide-Area Transaction Environment," SIGCOMMn '95 Workshop on Middleware: Cambridge, Mass., Aug. 1995, pp. 1-3.

Java Remote Method Invocation Specification, JDK 1.1 FCS, Sun Microsystems, Inc. Feb. 1997, chapters 5 and 7.

Jaworski, "Java 1.1 Developer's Guide, 2nd Edition," Sams.net, 1997.

Jennings, N.R. et al., "Using Intelligent Agents to Manage Business Processes," Dept. Electronic Engineering, Queen Mary & Westfield College, Mile End Road, London, E1 4NS, U.K., XP-002254546, 1996 (pp. 345-360).

Jones et al., "Garbage Collection: Algorithms for Automatic Dynamic Memory Management," pp. 165-175, John Wiley & Sons, 1996.

Jul et al., "Fine-Grained Mobility in the Emerald System," University of Washington, ACM Transactions on Computer Systems, vol. 6, No. 1, Feb. 1988, pp. 109-133.

Jul, "Object Mobility in a Distributed Object-Oriented System," A Dissertation, University of Washington, 1989, pp. 1-154 (1 page Vita).

Kambhatla et al., "Recovery with Limited Replay: Fault-Tolerant Processes in Linda," Oregon Graduate Institute, Technical Report CSIE 90-019, pp. 1-16, Sep. 1990.

Kay et al., "An Overview of the Raleigh Object-Oriented Database System," ICL Technical Journal, vol. 7, No. 4, pp. 780-798, Oxford, GB, Nov. 1991.

Keller, "Smart Catalogs and Virtual Catalogs," Proceedings of the First USENIX Workshop of Electronic Commerce, USENIX Association, Jul. 11-12, 1995, pp. 125-131.

Klein et al., "Trade'ex: The Stock Exchange of the Computer Industry," Harvard Business School Publishing, 1996, pp. 1-14.

Kodak Photonet FAQ, PhotoNet Online, Jun. 14, 2002, pp. 1-3.

Kolodner et al., "Atomic Garbage Collection: Managing a Stable Heap," ACM, 1989, pp. 15-25.

Koshizuka et al., "Window Real-Objects: A Distributed Shared Memory for Distributed Implementation of GUI Applications," Nov. 1993, pp. 237-247.

Kougiouris et al., "Support for Space Efficient Object Invocation in Spring," Sep. 1994.

Kramer, "Netwatch; The AJC's Daily Online Guide; Get the picture: Kodak will send photos to Web," The Atlanta Journal and Constitution, Sec. Features, p. 08C, Jun. 5, 1997.

Krasner et al., "Smalltalk-80: Bits of History, Words of Advice," 1983, Xerox Corporation, pp. 1-344.

Krasner, "The Smalltalk-80 Virtual Machine," BYTE Publications Inc., pp. 300-320, Aug. 1991.

Lamport et al., "The Byzantine Generals Problem," ACM Transactions on Programming Languages and Systems, vol. 4, No. 3, pp. 382-401, Jul. 1982.

Lampson et al., "Authentication in Distributed Systems: Theory and Practice," ACM Transactions n Computer Systems, vol. 10, No. 4, Nov. 1992, pp. 265-310.

Lansky, "Without APS, Photo Life Goes on Via Internet," Photographic Trade News, Aug. 1996, pp. 19-23.

Lavana et al., "Executable Workflows: A Paradigm for Collaborative Design on the Internet," Jun. 1997, 6 pages.

Lewis, "Pacific Bell, MCI to Expand Internet Service," The New York Times, sec. D, col. 1 at 3, Mar. 28, 1995.

LightSurf Instant Imaging—Press Releases, "Kodak and LightSurf Collaborate on Kodak Picture Center Online," LifeSurf Technologies Inc., Jun. 14, 2002, pp. 1-3.

Linda Database Search, pp. 1-68, Jul. 20, 1995.

Lindholm et al., "The Java (TM) Virtual Machine Specification," Addison Wesley, 1996.

Liskov et al., "Distributed Object Management in Thor," International Workshop on Distributed Object Management, p. 12, 1992.

Louwerse et al., "Data Protection Aspects in an Integrated Hospital Information System," North-Holland Computers & Security 3, 1984, pp. 286-294.

McDaniel, "An Analysis of a Mesa Instruction Set," Xerox Corporation, May 1982.

McEnaney, "Point-and-Click Memory Sharing; Launches PhotoNet online digital photography and imaging services," Photographic Trade News, Sec. p. 23, Jan. 1997.

McGrath, "Discovery and Its Discontents: Discovery Protocols for Ubiquitous Computing," Presented at Center for Excellence in Space Data and Information Science, NASA Goddard Space Flight Center, Apr. 5, 2000.

Miller, "Web posting as a photo processing option," USA Today, Section: Life, p. 17D, Dec. 13, 1996.

Mitchell et al., "An Overview of the Spring System," Feb. 1994.

Mitchell et al., "Mesa Language Manual," Xerox Corporation, Palo Alto Research Center, 1978.

Morris et al., "Andrew: A Distributed Personal Computing Environment," Communications of the ACM, vol. 29, No. 3, Mar. 1986, pp. 184-201.

Mullender, "Distributed Systems," Second Edition, Addison-Wesley, 1993.

Mummert et al., "Long Term Distributed File Reference Tracing: Implementation and Experience," Carnegie Mellon University School of Computer Science, pp. 1-28, Nov. 1994.

MUX-Elektronik, Java 1.1 Interactive Course, www.IIs.se/~mux/javaic.html, 1995.

O'Mahony, "Security Considerations in a Network Management Environment," IEEE Network, May/Jun. 1994, pp. 12-17.

Oppen et al., "The Clearinghouse: A Decentralized Agent for Locating Names Objects in a Distributed Environment," ACM Transactions on Office Information Systems, vol. 1, No. 3, Jul. 1983, pp. 230-253.

Opyrchal et al., "Efficient Object Serialization in Jave", Department of Electrical Engineering and Computer Science, University of Michigan, May 5, 1999.

Orfali et al., "The Essential Distributed Objects Survival Guide," Chapter 11: Corba Commercial ORBs, pp. 203-215, John Wiley & Sons, Inc., 1996.

Osborn, "The Role of Polymorphism in Schema Evolution in an Object-Oriented Database," IEEE Transactions on Knowledge and Data Engineering, vol. 1, No. 3, Sep. 1989, pp. 310-317.

Ousterhout et al., "The Sprite Network Operating System," Computer, IEEE, pp. 23-36, Feb. 1988.

Petersen, "New But Not Improved," Direct Magazine, Nov. 1995.

Pier, "A Retrospective on the Dorado, A High-Performance Personal Computer," IEEE Conference Proceedings, The 10th Annual International Symposium on Computer Architecture, 1983.

Pier, "A Retrospective on the Dorado, A High-Performance Personal Computer," Xerox Corporation, Aug. 1983.

Pinakis, "Using Linda as the Basis of an Operating System Microkernel," University of Western Australia, Department of Computer Science, pp. 1-165, Aug. 1993.
Press Release, "Sun Goes Live With the Kodak Picture Network," Sun Microsystems, Inc., Jun. 14, 2002, pp. 1-2.
Proceedings of the Eighth Symposium on Operating Systems Principles, Dec. 14-16, 1981, ACM, Special Interest Group on Operating Systems, Association for Computing Machinery, vol. 15, No. 5, Dec. 1981, ACM Order No. 534810.
Proudfoot, "Replects: Data Replication in the Eden System," Department of Computer Science, University of Washington, Technical Report No. TR-85-12-04, Dec. 1985, pp. 1-156.
Pu, "Replication and Nested Transaction in the Eden Distributed System," Doctoral Dissertation, University of Washington, Aug. 6, 1986, pp. 1-179 (1 page Vita).
Raeder, "Is there a Prodigy in your future?," Database Searcher, vol. 5, No. 6, p. 18, Jun. 1989.
Ramm et al., "Exu—A System for Secure Delegation of Authority on an Insecure Network," Ninth System Administration Conference, 1995 Lisa IX, Sep. 17-22, 1995, pp. 89-93.
Riggs et al., "Pickling State in the Java (TM) System," USENIX Association Conference on Object-Oriented Technologies and Systems, XP-002112719, pp. 241-250, Jun. 17-21, 1996.
Rosenberry et al., "Understanding DCE," Chapters 1-3, 6, 1992.
Satyanarayanan, "Integrating Security in a Large Distributed System," ACM Transactions on Computer Systems, vol. 7, No. 3, Aug. 1989, pp. 247-280.
Schroeder et al., "Experience with Grapevine: The Growth of a Distributed System," ACM Transactions on Computer Systems, vol. 2, No. 1, Feb. 1984, pp. 3-23.
Senn, "Capitalizing on Electronic Commerce: The Role of the Internet in Electronic Markets," Information Systems Management, Summer 1996, pp. 15-24.
Sharrott et al., "ObjectMap: Integrating High Performance Resources into a Distributed Object-oriented Environment," ICODP, 1995.
Steinke, "Design Aspects of Access Control in a Knowledge Base System," Computers & Security, 10, 1991, pp. 612-625.
Stern, "Industry Net," Link-Up, Mar./Apr. 1995, p. 10.
Stevenson, "Token-Based Consistency of Replicated Servers," IEEE, CH2686-4/89/0000/0179, pp. 179-183, 1989.
Tanenbaum et al., "Distributed Operating Systems," Computing Surveys, vol. 17, No. 4, Dec. 1985, pp. 419-470.
The Wall Street Journal, "Barclays Is Opening an 'Electronic Mall' for Internet Shopping," Tech. & Health Section at B2, Jun. 1, 1995.
The Wall Street Journal, "Prodigy Plans to Announce Internet 'Electronic Mail'," Tech. Section at B5, Nov. 27, 1995.
Thompson, "Regular Expression Search Algorithm," Communications of the ACM, vol. II, No. 6, p. 149 et seq., Jun. 1968.
Trehan et al., "Toolkit for Shared Hypermedia on a Distributed Object Oriented Architecture," 1993, pp. 1-8.
Trommer, "Thomas Unveils Online Purchasing Network—Eases Product Sourcing and Ordering Through EDI," Electronic Buyers' News at 60, Dec. 11, 1995.
Van Den Berg et al., "Advanced Topics of a Computer Center Audit," North-Holland Computers & Security 3, 1984, pp. 171-185.
Van Der Lans, "Data Security in a Relational Database Environment," North-Holland Computers & Security 5, 1986, pp. 128-134.
Venners, "Jini Technology, Out of the Box," Javaworld, 'Online!, pp. 1-4, Dec. 1998.
Waldo et al., "Events in an RPC Based Distributed System," Proceedings Of The 1995 USENIX Technical Conference, Proceedings USENIX Winter 1995 Technical Conference, New Orleans, LA, USA, 16-20, pp. 131-142, Jan. 1995.
Welz, "New Deals: A ripening Internet market, secure systems and digital currency are reshaping global commerce," Internet World, Jun. 1995, pp. 36-41.
Wilson et al., "Design of the Opportunistic Garbage Collector," Proceedings of the Object Oriented Programming Systems Languages and Applications Conference, New Orleans, vol. 24, No. 10, Oct. 1989.
Wobber et al., "Authentication in the Taos Operating System," ACM, 1993, pp. 256-269.
Wollrath et al., "A Distributed Object Model for the Java (TM) System," USENIX Association, Conference on Object-Oriented Technologies and Systems, Jun. 17-21, 1996.
Wollrath et al., "Java-Centric Distributed Computing," IEEE Micro, pp. 44-53, 1997.
Wu, "A Type System for an Object-Oriented Database System," Proceedings of the International Computer Software and Applications Conference (COMPSAC), Tokyo, Japan, pp. 333-338, Sep. 11-13, 1991.
Wyatt, "Netscape Enterprise Server," Prima Publishing, 1996.
Yemini et al., "Towards Programmable Networks," IFIP/IEEE International Workshop on Distributed Systems: Operations and Management, L'Aquila, Italy, Oct. 1996.
Yin et al., "Using Leases to Support Server Driven Consistency in Large-Scale Systems," Computer Services Department, University of Texas at Austin, p. 285-294, May 26-28, 1998.
Yin et al., "Volume Leases for Consistency in Large-Scale Systems," IEEE Transactions on Knowledge & Data Engineering, vol. 11, No. 4, pp. 563-576, Jul./Aug. 1999.
Li, Sing et al., "Professional Jini", Chapter 7, Aug., 2000.
Spiteri, M.D., et al., "An architecture to support storage and retrieval of events", 1998.
"Dynamic code downloading using RMI", http://java.sun.com/j2se/1.4.2/docs/guide/mi/codebase.html, 2003.
"Passing Proxies as Parameters to Methods and Return Values from Methods", IBM Technical Disclosure Bulletin, vol. 41, No. 1, Jan. 1998, pp. 89-92.
Subramanian, Sakthi et al., "Automatic Verification of Object Code Against Source Code," IEEE, 1996, pp. 46-55.
Wollrath, A., et al., "Simple Activation for Distributed Objects," USENIX Association, Conference on Object-Oriented Technologies (COOTS), Jun. 26-29, 1995.
Stoyenko, A.D., "SUPRA-RPC: Subprogram PaRAmeters in Remote Procedure Calls," *Software-Practice and Experience*, vol. 24(1), 27-49, 1994.
"Jini Distributed Leasing Specification", Sun Microsystems, Jan. 1999, XP-002209076. (26 pages).

* cited by examiner

DYNAMIC PROVISIONING FOR FILTERING AND CONSOLIDATING EVENTS

RELATED APPLICATIONS

This application is a continuation-in-part of U.S. patent application Ser. No. 10/767,345 for Dynamic Provisioning of Identification Services in a Distributed System, filed Jan. 30, 2004 and incorporated herein by reference. This application also relates to U.S. patent application Ser. No. 09/947,528 for Dynamic Provisioning of Service Components in a Distributed System, filed Sep. 7, 2001, U.S. patent application Ser. No. 09/947,549 for Distributed Metric Discovery and Collection in a Distributed System, filed Sep. 7, 2001, and U.S. patent application Ser. No. 10/390,895 for Systems and Methods for Providing Dynamic Quality of Service for a Distributed System, filed Mar. 19, 2003, which are relied upon and incorporated herein by reference.

FIELD OF THE INVENTION

This invention relates to techniques for dynamically filtering and consolidating events from identification service providers and, more particularly, to methods and systems for provisioning services to process identification data received from a device.

BACKGROUND OF THE INVENTION

Distributed systems today enable a device connected to a communications network to take advantage of services available on other devices located throughout the network. Each device in a distributed system may have its own internal data types, its own address alignment rules, and its own operating system. To enable such heterogeneous devices to communicate and interact successfully, developers of distributed systems can employ a remote procedure call (RPC) communication mechanism.

RPC mechanisms provide communication between processes (e.g., programs, applets, etc.) running on the same machine or different machines. In a simple case, one process, i.e., a client, sends a message to another process, i.e., a server. The server processes the message and, in some cases, returns a response to the client. In many systems, the client and server do not have to be synchronized. That is, the client may transmit the message and then begin a new activity, or the server may buffer the incoming message until the server is ready to process the message.

The Java™ programming language is an object-oriented programming language frequently used to implement such a distributed system. A program written in the Java programming language is compiled into a platform-independent format, using a bytecode instruction set, which can be executed on any platform supporting the Java virtual machine (JVM). The JVM may be implemented on any type of platform, greatly increasing the ease with which heterogeneous machines can be federated into a distributed system.

The Jini™ architecture has been developed using the Java programming language to enable devices in a distributed system to share services using remote method invocation (RMI). Traditional Jini systems use RMI to enable a client device to request and receive a service provided by a server device on a remote machine. While conventional Jini systems provide a basic architecture for providing services in a distributed system, they do not provide tools specifically directed to providing complex services. Current systems do not address provisioning a service, such as application software, to make it available to the distributed system in the first place. Furthermore, conventional systems do not consider the requirements of a specific service before provisioning the service to make it available in the distributed system.

For example, one such distributed system may include reader devices using Radio Frequency Identification (RFID) technology, and services that receive and process identification data from the reader devices and synthesize the processed data into meaningful business data. Although RFID technology is well known, conventional RFID systems do not operate satisfactorily in a distributed system, where network changes, such as the failure of a computer resource or the introduction of a new resource, are common. Furthermore, conventional RFID systems do not discover reader devices dynamically. It is therefore desirable to provide RFID systems that operate in a distributed, robust, reliable, scalable manner.

SUMMARY OF THE INVENTION

Methods and systems consistent with the present invention provide identification services over a distributed network. Systems and methods provide the tools to receive data from reader devices, process the received data, and provide the processed data to users. Enhanced event handling and dynamic service provisioning enable robust and flexible deployment of identification services in a distributed network.

According to an aspect of the invention, a method provides an identification service in a distributed system, comprising providing a set of one or more service elements, each service element including an adapter, a filter, and a logger and receiving, by a filter, criteria in accordance with predetermined instructions and receiving, by an adapter, identification data from a reader. The identification data is provided by the adapter to a filter and the filter processes the identification data based on the criteria. The processed data is provided by the filter to a logger, and the logger provides notification of the processed data. The service elements are monitored to determine whether any service element fails.

In accordance with another aspect of the invention, a method provides an identification service in a distributed system by dynamically creating an application corresponding to each of a plurality of service elements, each service element including an adapter, a filter, and a logger. The filter application receives criteria specified by a user and the adapter application receives identification information corresponding to an item from a reader and provides the identification information to the filter application. The filter application processes the identification information application based on the criteria to create processed information including at least an identification code for the item and provides the processed information to the logger application. The logger application provides the processed information to a recipient. The application corresponding to each service element is monitored to determine whether any application fails.

According to another embodiment of the present invention, a system provides a distributed identification service comprising a reader service having service elements comprising an adapter that receives identification information from one or more reader based on predetermined criteria, a filter that processes the identification information based on the criteria, and a logger that provides notification of the processed information. The system further comprises a registry service that establishes the reader service and its service elements and a monitor service that determines whether the application service or any of the service elements fails.

Additional features of the invention will be set forth in part in the description which follows, and in part will be obvious from the description, or may be learned by practice of the invention.

BRIEF DESCRIPTION OF THE DRAWINGS

It is to be understood that both the foregoing general description and the following detailed description are exemplary and explanatory only and are not restrictive of the invention, as claimed. The accompanying drawings, which are incorporated in and constitute a part of this specification, illustrate several embodiments of the invention and together with the description, serve to explain the principles of the invention. In the drawings:

DETAILED DESCRIPTION

The following description of embodiments of this invention refers to the accompanying drawings. Where appropriate, the same reference numbers in different drawings refer to the same or similar elements.

Introduction

Systems consistent with the present invention provide identification services over a distributed network through a collection of service components that interface with identification devices and process data received from the devices. For example, items may be uniquely identified by an electronic product code (EPC) encoded in RFID tags. A reader device may detect the presence of an RFID tag and scan the EPC and any other information contained in the RFID tag. The data may then be used by applications such as an inventory system or a retail system to track and manage the items. One such identification network is described in the Auto-ID Savant Specification 1.0, available at www.autoidcenter.org.

An identification service consistent with an embodiment of the present invention provides a distributed middleware component between reader devices and users of identification data such as applications, databases, etc. By its nature, an identification service using RFID technology is typically widely distributed. Readers may be separated by a great distance from the users of identification data. For example, an international retailer may need to track inventory in stores around the world using computer systems located in a central headquarters. In another example, a shipping company may use RFID readers throughout a series of processing facilities and transportation hubs to track shipments.

One embodiment of the present invention can be implemented using the Rio™ architecture developed by Sun Microsystems and described in greater detail below. Rio uses tools provided by the Jini™ architecture, such as discovery and event handling, to provision and monitor complex services, such as identification services, in a distributed system. Systems consistent with the present invention provide identification services that may be deployed in a distributed system, including tools to deconstruct a complex identification service into service elements, provision service elements that are needed to make up the complex identification service, and monitor the service elements to ensure that the complex identification service is supported in a dynamic, robust fashion.

Exemplary Distributed System

Figure 1:
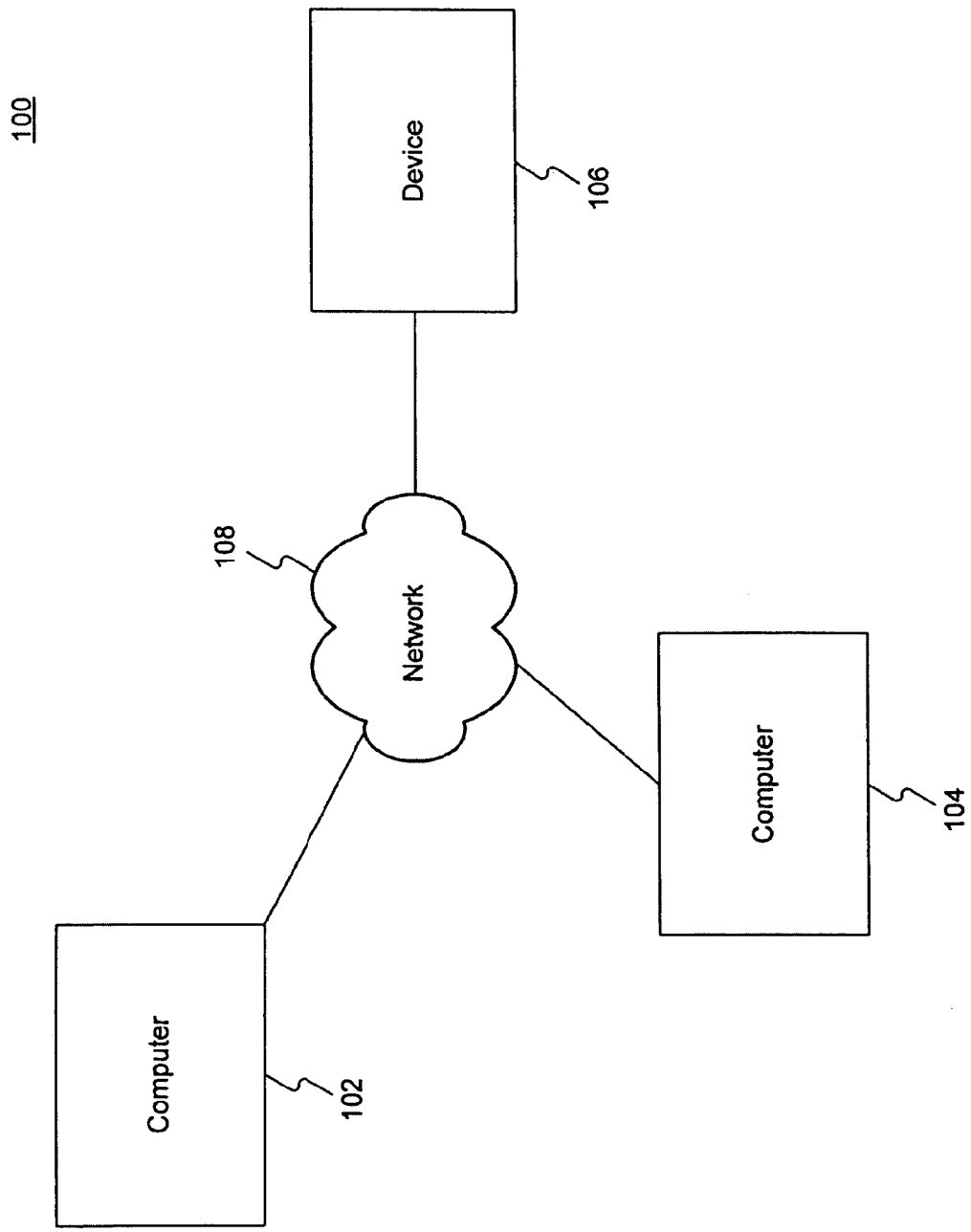
FIG. 1 is a high level block diagram of an exemplary system for practicing systems and methods consistent with the present invention.

FIG. 1 is a high-level block diagram of an exemplary distributed system consistent with the present invention. FIG. 1 depicts a distributed system 100 that includes computers 102 and 104 and a device 106 communicating via a network 108. Computers 102 and 104 can use any type of computing platform. Device 106 may be any of a number of devices, such as a reader device, printer, fax machine, storage device, or computer. Network 108 may be, for example, a local area network, wide area network, or the Internet. Although only two computers and one device are depicted in distributed system 100, one skilled in the art will appreciate that distributed system 100 may include additional computers and/or devices.

The computers and devices of distributed system 100 provide services to one another. A "service" is a resource, data, or functionality that can be accessed by a user, program, device, or another service. Typical services include devices, such as reader devices, printers, displays, and disks; software, such as applications or utilities; and information managers, such as databases and file systems. These services may appear programmatically as objects of the Java programming environment and may include other objects, software components written in different programming languages, or hardware devices. As such, a service typically has an interface defining the operations that can be requested of that service.

Figure 2:
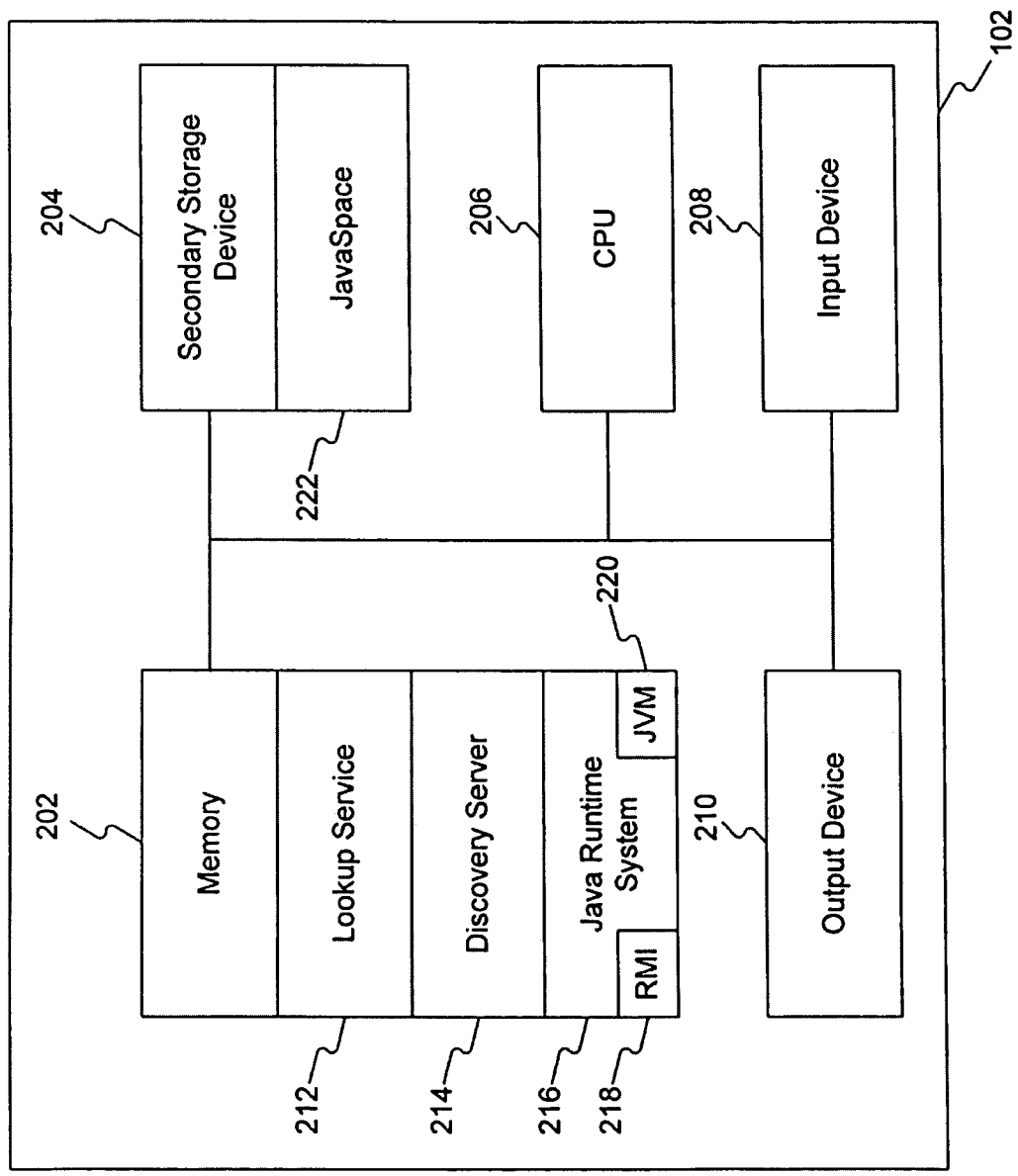
FIG. 2 depicts a computer in greater detail to show a number of the software components of an exemplary distributed system consistent with the present invention.

FIG. 2 depicts computers 102 in greater detail to show a number of the software components of distributed system 100. One skilled in the art will recognize that computer 104 and device 106 could be similarly configured. Computer 102 contains a memory 202, a secondary storage device 204, a central processing unit (CPU) 206, an input device 208, and output device 210. Memory 202 includes a look-up service 212, a discovery server 214, and a Java runtime system 216. Java runtime system 216 includes Remote Method Invocation (RMI) process 218 and Java virtual machine (JVM) 220. Secondary storage device 204 includes a Java space 222.

Memory 202 can be, for example, a random access memory. Secondary storage device 204 can be, for example, a CD-ROM. CPU 206 can support any platform compatible with JVM 220. Input device 208 can be, for example, a keyboard or mouse. Output device 210 can be, for example, a printer.

JVM 220 acts like an abstract computing machine, receiving instructions from programs in the form of bytecodes and interpreting these bytecodes by dynamically converting them into a form for execution, such as object code, and executing them. RMI 218 facilitates remote method invocation by allowing objects executing on one computer or device to invoke methods of an object on another computer or device. Lookup Service 212 and Discovery Server 214 are described in detail below. Java space 222 is an object repository used by programs within distributed system 100 to store objects. Programs use Java space 222 to store objects persistently as well as to make them accessible to other devices within distributed system 100.

The Jini Environment

The Jini environment enables users to build and maintain a network of services running on computers and devices. Jini is an architectural framework provided by Sun Microsystems that provides an infrastructure for creating a flexible distributed system. In particular, the Jini architecture enables users to build and maintain a network of services on computers and/or devices. The Jini architecture includes Lookup Service 212 and Discovery Server 214 that enable services on the network to find other services and establish communications directly with those services.

Lookup Service 212 defines the services that are available in distributed system 100. Lookup Service 212 contains one object for each service within the system, and each object contains various methods that facilitate access to the corresponding service. Discovery Server 214 detects when a new device is added to distributed system 100 during a process known as boot and join, or discovery. When a new device is detected, Discovery Server 214 passes a reference to the new device to Lookup Service 212. The new device may then register its services with Lookup Service 212, making the device's services available to others in distributed system 100. One skilled in the art will appreciate that exemplary distributed system 100 may contain many Lookup Services and Discovery Servers.

Figure 3:
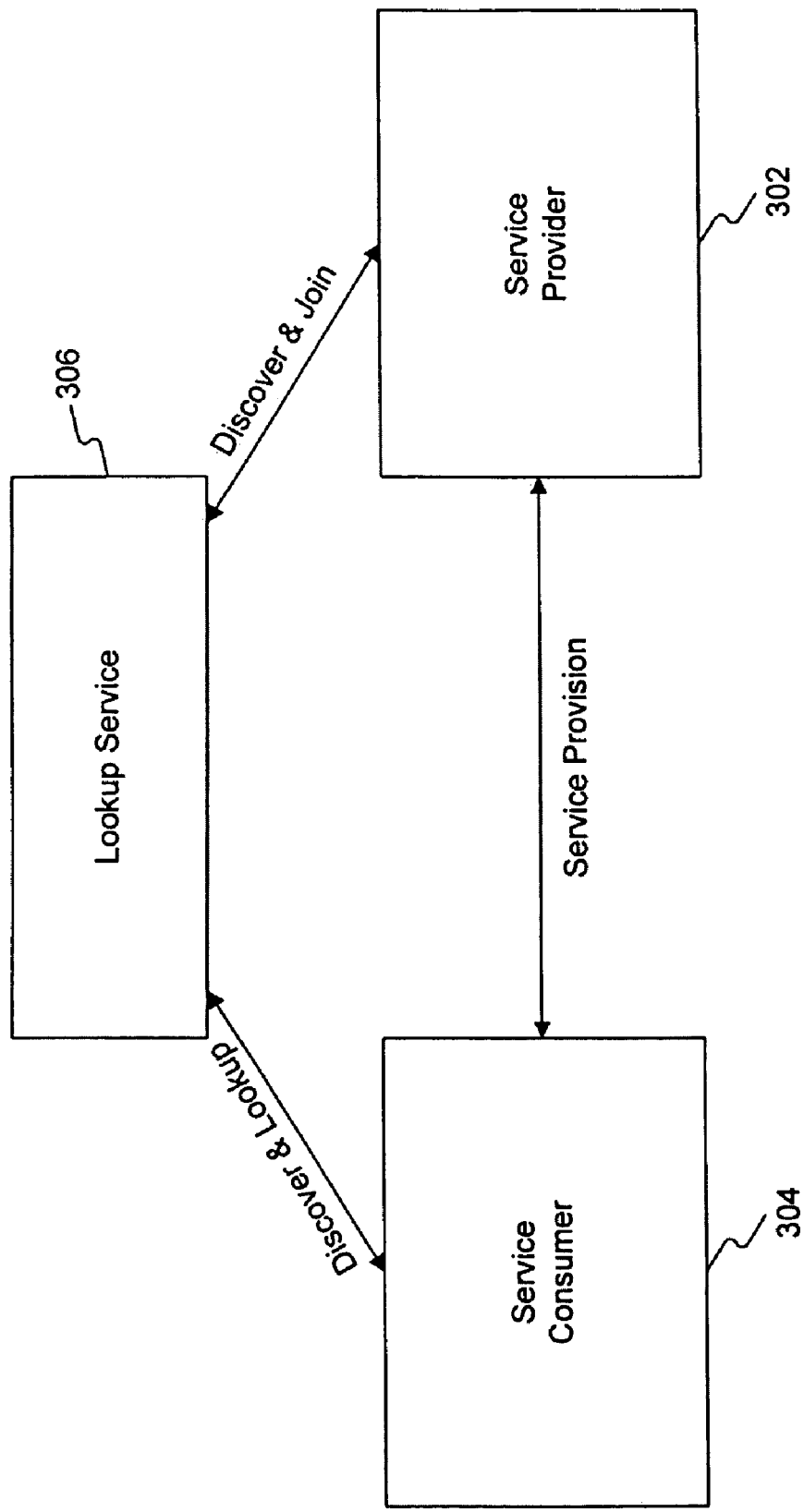
FIG. 3 depicts an embodiment of the discovery process in more detail, in accordance with the present invention.

FIG. 3 depicts an embodiment of the discovery process in more detail. This process involves a service provider 302, a service consumer 304, and a lookup service 306. One skilled in the art will recognize that service provider 302, service consumer 304, and lookup service 306 may be objects running on computer 102, computer 104, or device 106.

Service provider 302 discovers and joins lookup service 306, making the services provided by service provider 302 available to other computers and devices in the distributed system. When service consumer 304 requires a service, it discovers lookup service 306 and sends a lookup request specifying the needed service to lookup service 306. In response, lookup service 306 returns a proxy that corresponds to service provider 302 to service consumer 304. The proxy enables service consumer 304 to establish contact directly with service provider 302. Service provider 302 is then able to provide the service to service consumer 304 as needed. An implementation of the lookup service is explained in "The Jini™ Lookup Service Specification," contained in Arnold et al., *The Jini™ Specification*, Addison-Wesley, 1999, pp. 217-231.

Distributed systems that use the Jini architecture often communicate via an event handling process that allows an object running on one Java virtual machine (i.e., an event consumer or event listener) to register interest in an event that occurs in an object running on another Java virtual machine (i.e., an event generator or event producer). An event can be, for example, a change in the state of the event producer. When the event occurs, the event consumer is notified. This notification can be provided by, for example, the event producer.

Figure 4:
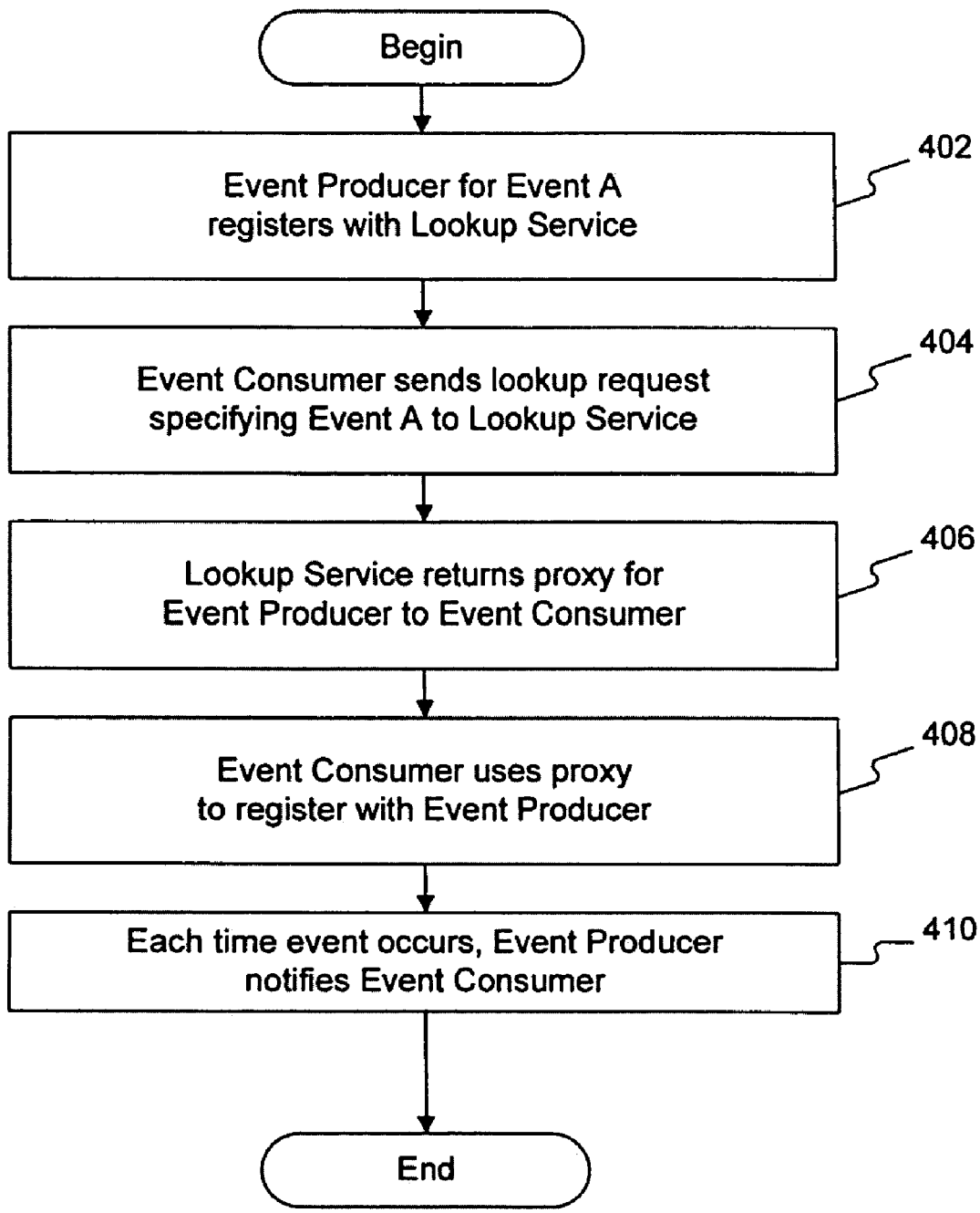
FIG. 4 is a flow chart of an embodiment of the event handling process, in accordance with the present invention.

FIG. 4 is a flow chart of one embodiment of the event handling process. An event producer that produces event A registers with a lookup service (step 402). When an event consumer sends a lookup request-specifying event A to the lookup service (step 404), the lookup service returns a proxy for the event producer for event A to the event consumer (step 406). The event consumer uses the proxy to register with the event producer (step 408). Each time the event occurs thereafter, the event producer notifies the event consumer (step 410). An implementation of Jini event handling is explained in "The Jini™ Distributed Event Specification," contained in Arnold et al., *The Jini™ Specification*, Addison-Wesley, 1999, pp. 155-182.

Overview of Rio™ Architecture

The Rio architecture enhances the basic Jini architecture to provision and monitor complex services by considering a complex service as a collection of service elements. To provide the complex service, the Rio architecture instantiates and monitors a service instance corresponding to each service element. A service element might correspond to, for example, an application service or an infrastructure service. In general, an application service is developed to solve a specific application problem, such as processing identification information, word processing, or spreadsheet management. An infrastructure service, such as the Jini lookup service, provides the building blocks on which application services can be used. One implementation of the Jini lookup service is described in U.S. Pat. No. 6,185,611, for "Dynamic Lookup Service in a Distributed System," which is incorporated herein by reference.

Figure 5:
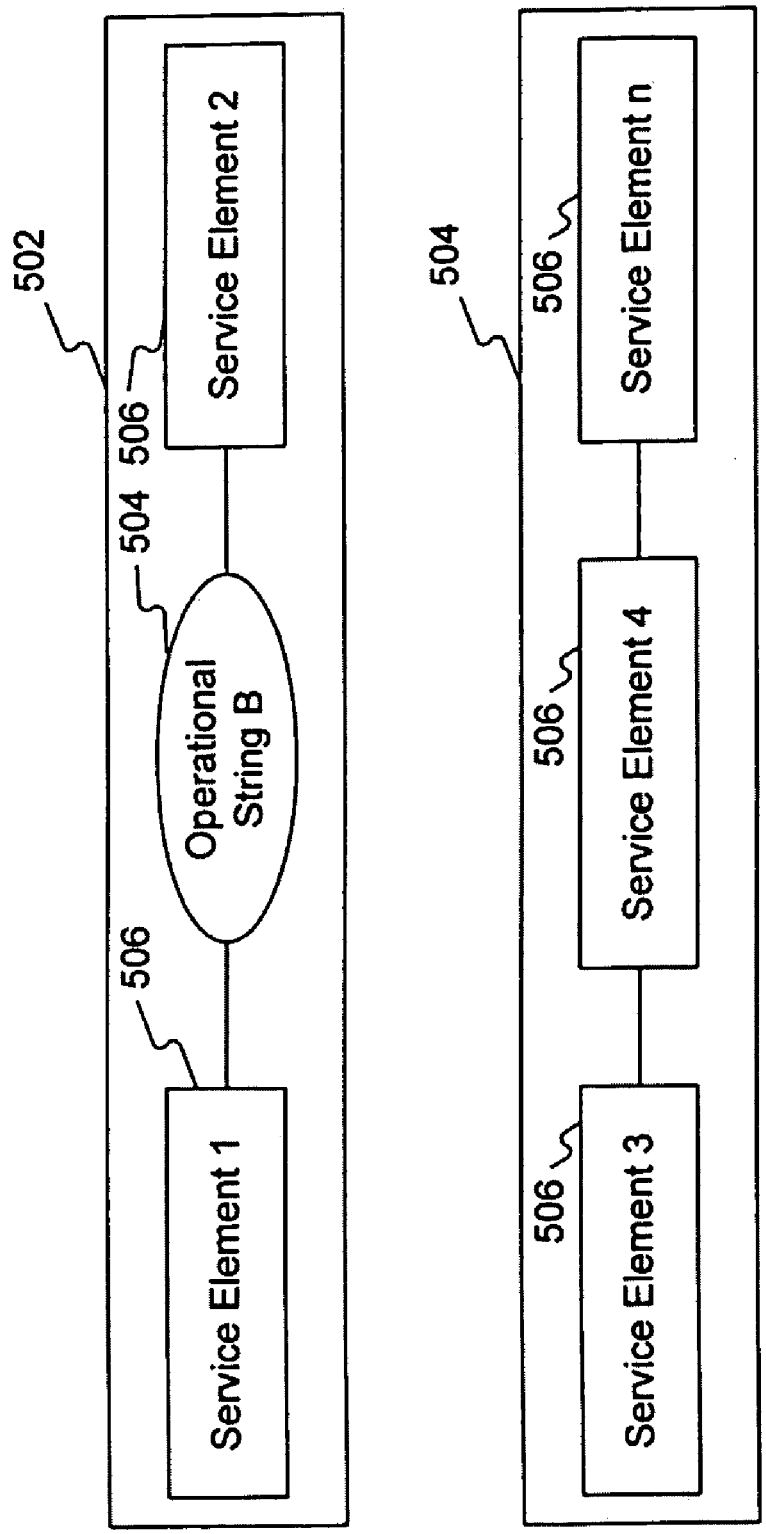
FIG. 5 is a block diagram of an exemplary operational string, in accordance with the present invention.

Consistent with the present invention, a complex service can be represented by an operational string. FIG. 5 depicts an exemplary operational string 502 that includes one or more service elements 506 and another operational string B 504. Operational string B 504 in turn includes additional service elements (3, 4, . . . n) 506. For example, operational string 502 might represent an identification service. Service element 1 might be an interface with a reader device and service element 2 might be an interface with a user of identification data. Operational string B might be a service to process data received from the reader device. Service element 3 might then be a filter to remove unnecessary data, service element 4 might be a queue storing filtered data, etc. In an embodiment of the present invention, an operational string can be expressed as an XML document. It will be clear to one of skill in the art that an operational string can contain any number of service elements and operational strings.

Figure 6:
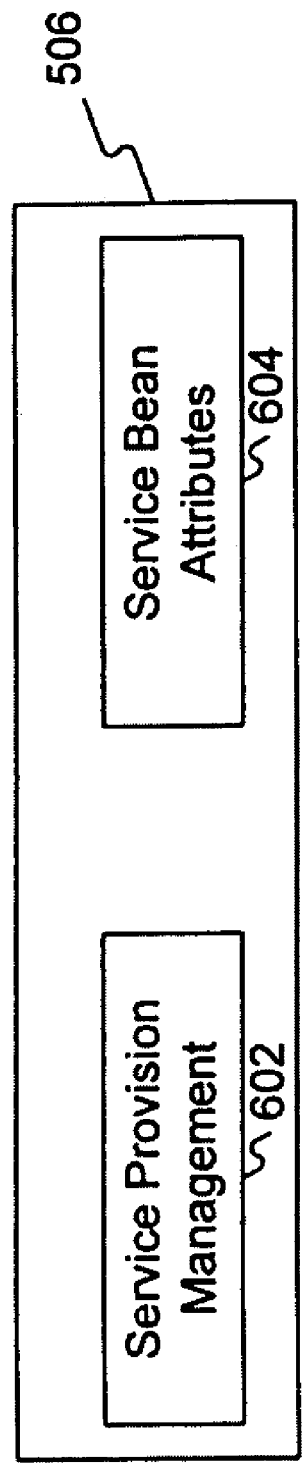
FIG. 6 is a block diagram of an exemplary service element, in accordance with the present invention.

FIG. 6 is a block diagram of a service element in greater detail. A service element contains instructions for creating a corresponding service instance. In one implementation consistent with the present invention, service element 506 includes a service provision management object 602 and a service bean attributes object 604. Service provision management object 602 contains instructions for provisioning and monitoring the service that corresponds to service element 506. For example, if the service is a software application, these instructions may include the requirements of the software application, such as hardware requirements, response time, throughput, etc. Service bean attributes object 604 contains instructions for creating an instance of the service corresponding to service element 506. In one implementation consistent with the present invention, a service instance is referred to as a Jini™ Service Bean (JSB).

Jini™ Service Beans

A Jini™ Service Bean (JSB) is a Java object that provides a service in a distributed system. As such, a JSB implements one or more remote methods that together constitute the service provided by the JSB. A JSB is defined by an interface that declares each of the JSBs remote methods using Jini™ Remote Method Invocation (RMI) conventions. In addition to its remote methods, a JSB may include a proxy and a user interface consistent with the Jini architecture.

Figure 7:
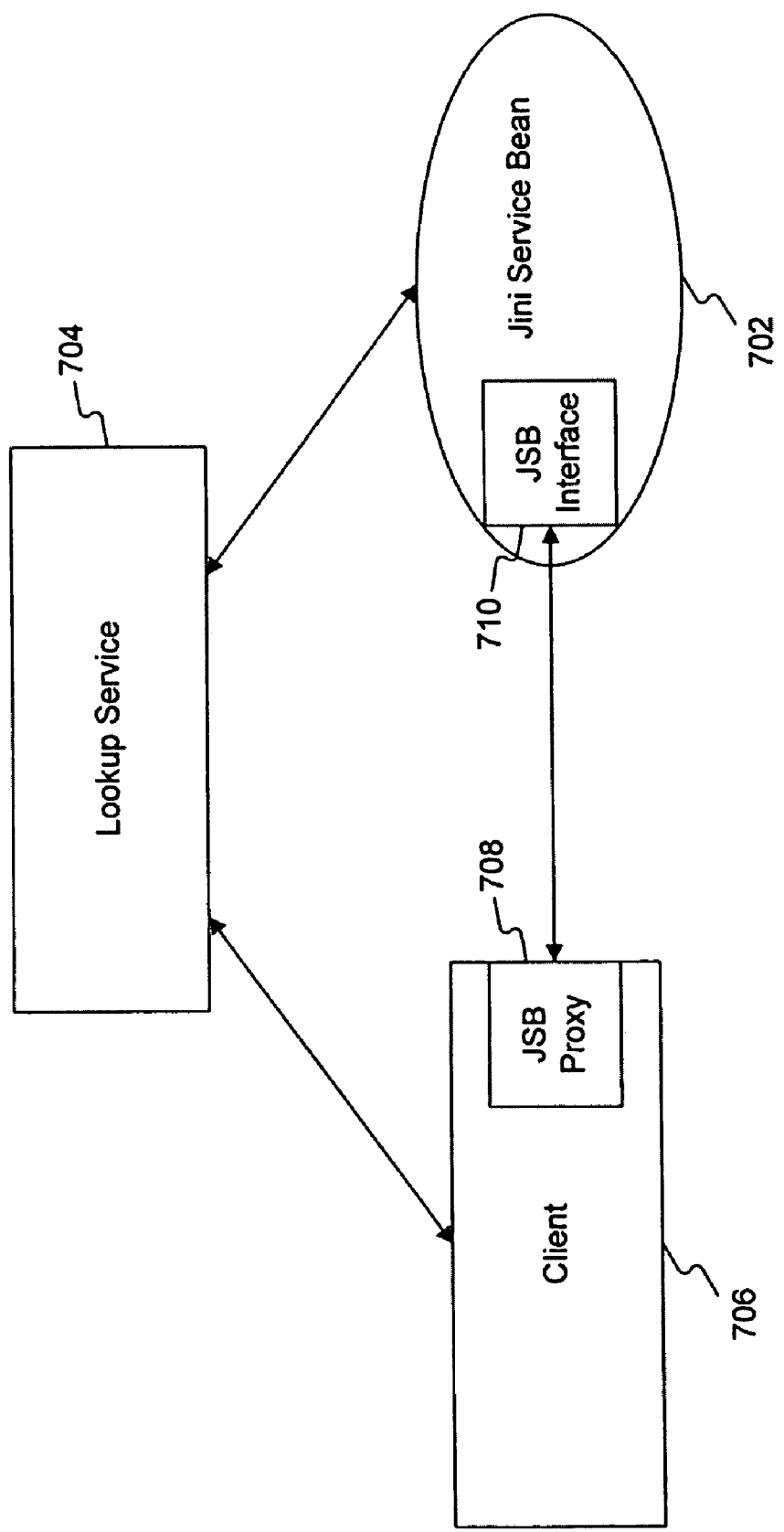
FIG. 7 depicts a block diagram of a system in which a Jini™ Service Bean (JSB) provides its service to a client, in accordance with the present invention.

FIG. 7 depicts a block diagram of a system in which a JSB provides its service to a client. This system includes a JSB 702, a lookup service 704, and a client 706. When JSB 702 is created, it registers with lookup service 704 to make its service available to others in the distributed system. When a client 706 needs the service provided by JSB 702, client 706 sends a lookup request to lookup service 702 and receives in response a proxy 708 corresponding to JSB 702. Consistent with an implementation of the present invention, a proxy is a Java object, and its types (i.e., its interfaces and superclasses) represent its corresponding service. For example, a proxy object for a reader device would implement a reader device interface. Client 706 then uses JSB proxy 708 to communicate directly with JSB 702 via a JSB interface 710. This communication enables client 706 to obtain the service provided by JSB 702. Client 706 may be, for example, a process running on computer 102, and JSB 702 may be, for example, a process running on device 106.

Cybernode Processing

A JSB is created and receives fundamental life-cycle support from an infrastructure service called a "cybernode." A cybernode runs on a compute resource, such as a computer or other data processing device. In one embodiment of the present invention, a cybernode runs as a Java virtual machine, such as JVM 220, on a computer, such as computer 102. Consistent with the present invention, a compute resource may run any number of cybernodes at a time and a cybernode may support any number of JSBs.

Figure 8:
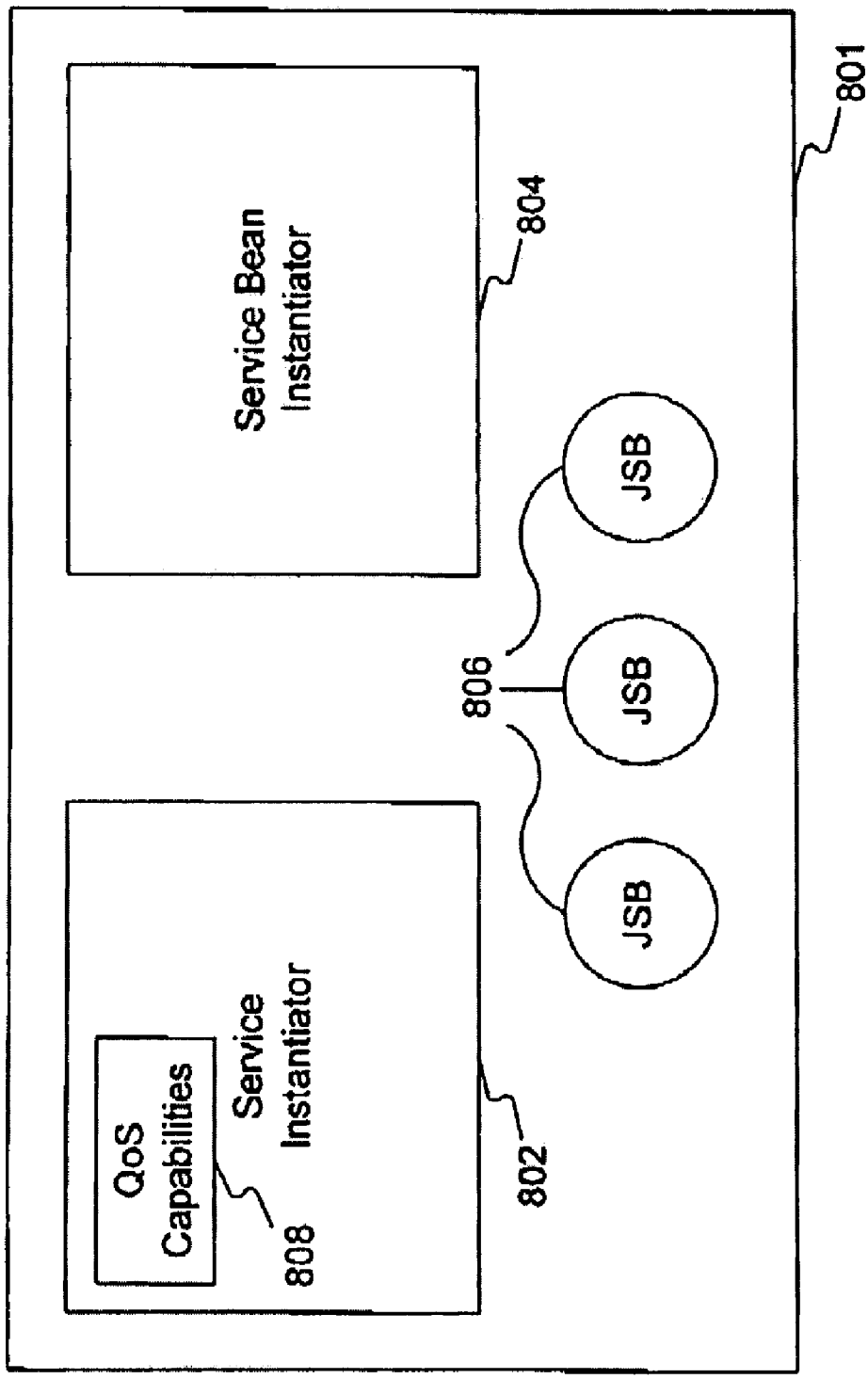
FIG. 8 depicts a block diagram of a cybernode in accordance with the present invention.

FIG. 8 depicts a block diagram of a cybernode. Cybernode 801 includes service instantiator 802 and service bean instantiator 804. Cybernode 801 may also include one or more JSBs 806 and one or more quality of service (QoS) capabilities 808. QoS capabilities 808 represent the capabilities, such as CPU speed, disk space, connectivity capability, bandwidth, etc., of the compute resource on which cybernode 801 runs.

Service instantiator object 802 is used by cybernode 801 to register its availability to support JSBs and to receive requests to instantiate JSBs. For example, using the Jini event handling process, service instantiator object 802 can register interest in receiving service provision events from a service provisioner, discussed below. A service provision event is typically a request to create a JSB. The registration process might include declaring QoS capabilities 808 to the service provisioner. These capabilities can be used by the service provisioner to determine what compute resource, and therefore what cybernode, should instantiate a particular JSB, as described in greater detail below. In some instances, when a compute resource is initiated, its capabilities are declared to the cybernode 801 running on the compute resource and stored as QoS capabilities 808.

Service bean instantiator object 804 is used by cybernode 801 to create JSBs 806 when service instantiator object 804 receives a service provision event. Using JSB attributes contained in the service provision event, cybernode 801 instantiates the JSB, and ensures that the JSB and its corresponding service remain available over the network. Service bean instantiator object 804 can be used by cybernode 801 to download JSB class files from a code server as needed.

Figure 9:
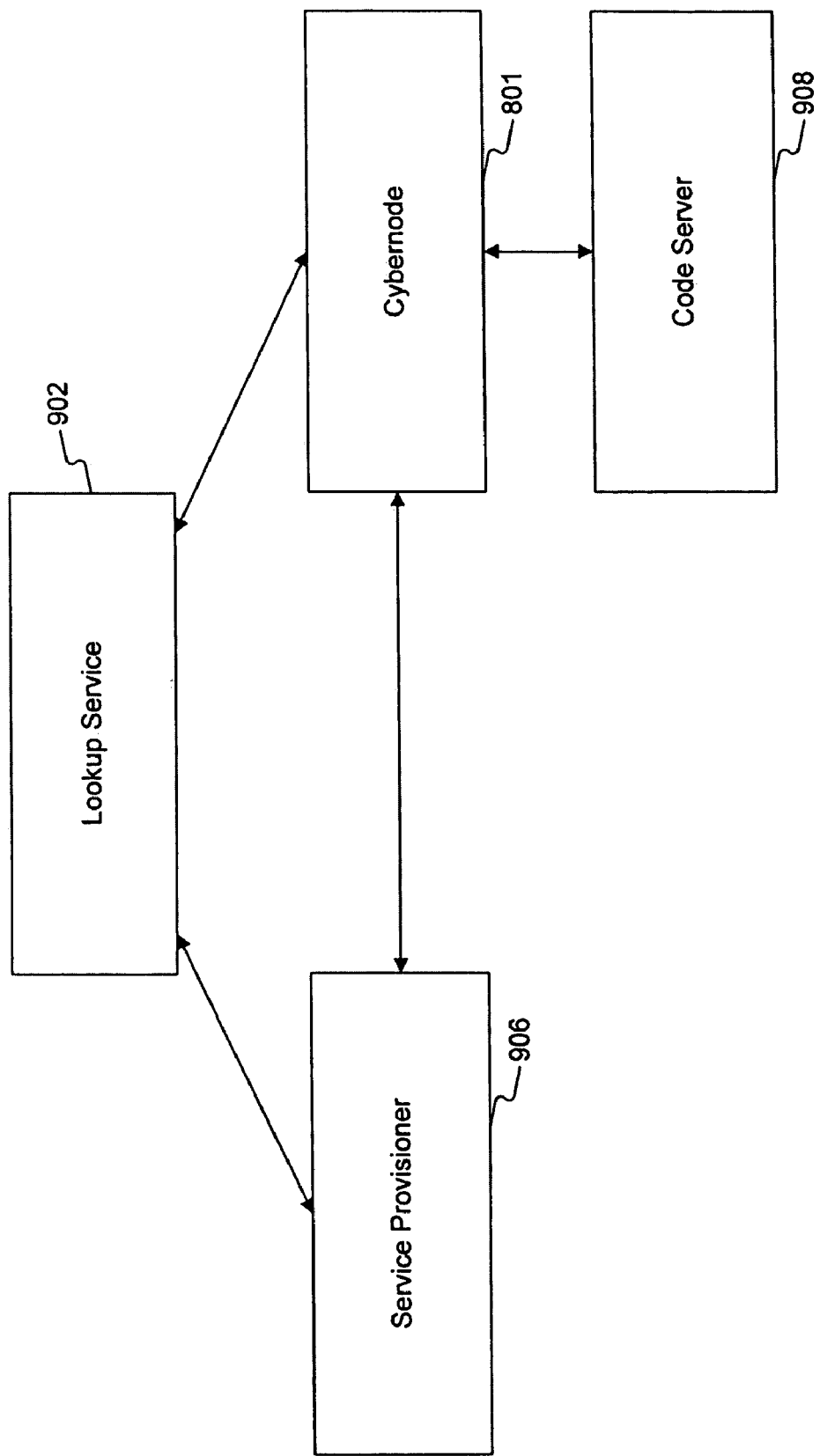
FIG. 9 depicts a block diagram of a system in which a cybernode interacts with a service provisioner, in accordance with the present invention.

FIG. 9 depicts a block diagram of a system in which a cybernode interacts with a service provisioner. This system includes a lookup service 902, a cybernode 801, a service provisioner 906, and a code server 908. As described above, cybernode 801 is an infrastructure service that supports one or more JSBs. Cybernode 801 uses lookup service 902 to make its services (i.e., the instantiation and support of JSBs) available over the distributed system. When a member of the distributed system, such as service provisioner 906, needs to have a JSB created, it discovers cybernode 801 via lookup service 902. In its lookup request, service provisioner 906 may specify a certain capability that the cybernode should have. In response to its lookup request, service provisioner 906 receives a proxy from lookup service 902 that enables direct communication with cybernode 801.

Figure 10:
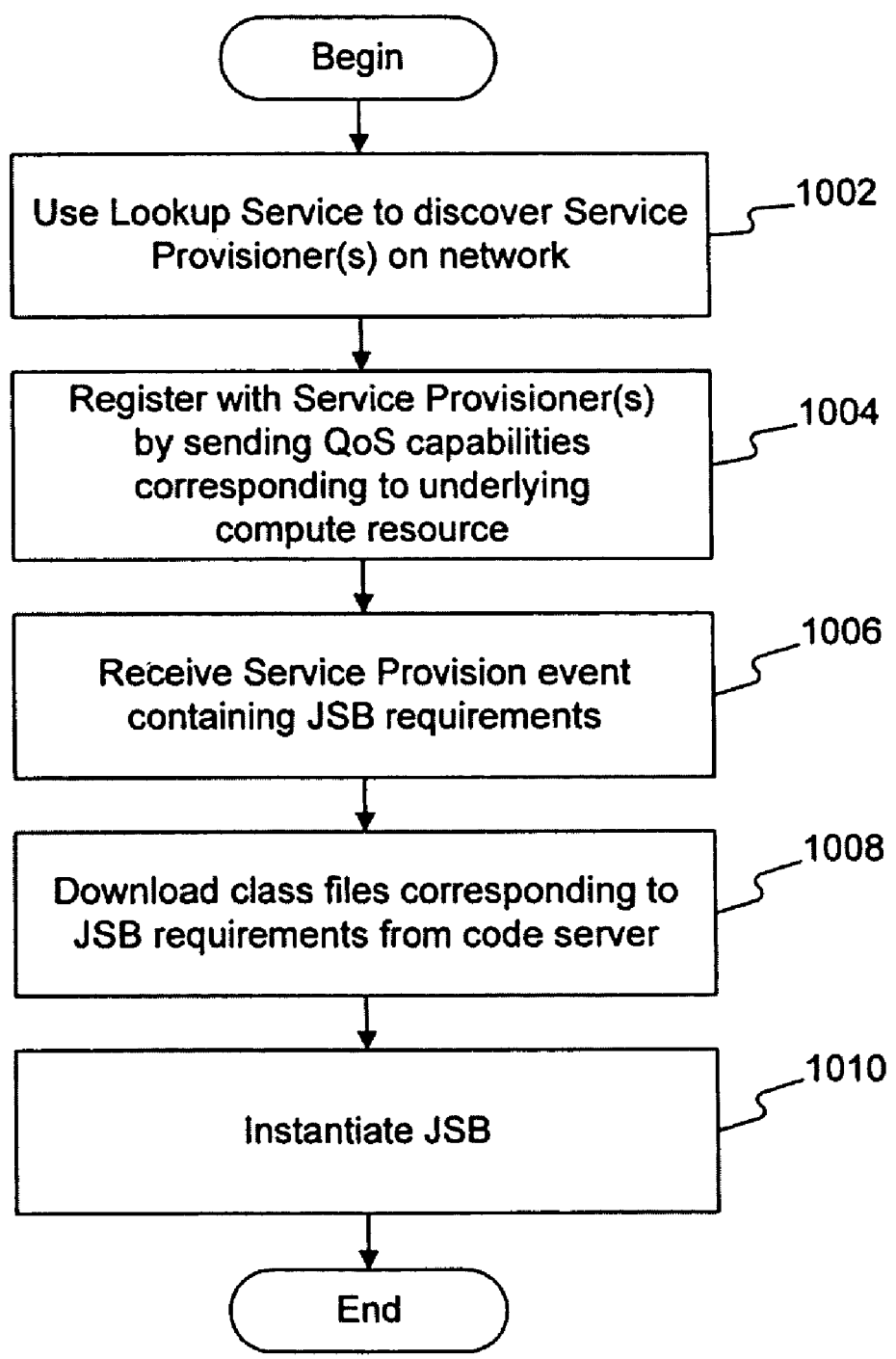
FIG. 10 is a flow chart of Jini™ Service Bean (JSB) creation performed by a cybernode, in accordance with the present invention.

FIG. 10 is a flow chart of JSB creation performed by a cybernode. A cybernode, such as cybernode 801, uses lookup service 902 to discover one or more service provisioners 906 on the network (step 1002). Cybernode 801 then registers with service provisioners 906 by declaring the QoS capabilities corresponding to the underlying compute resource of cybernode 801 (step 1004). When cybernode 801 receives a service provision event containing JSB requirements from service provisioner 906 (step 1006), cybernode 801 may download class files corresponding to the JSB requirements from code server 908 (step 1008). Code server 908 may be, for example, a HyperText Transfer Protocol (HTTP) server. Cybernode 801 then instantiates the JSB (step 1010).

As described above, JSBs and cybernodes comprise the basic tools to provide a service corresponding to a service element in an operational string consistent with the present invention. A service provisioner for managing the operational string itself will now be described.

Dynamic Service Provisioning

A service provisioner is an infrastructure service that provides the capability to deploy and monitor operational strings. As described above, an operational string is a collection of service elements that together constitute a complex service in a distributed system. To manage an operational string, a service provisioner determines whether a service instance corresponding to each service element in the operational string is running on the network. The service provisioner dynamically provisions an instance of any service element not represented on the network. The service provisioner also monitors the service instance corresponding to each service element in the operational string to ensure that the complex service represented by the operational string is provided correctly.

Figure 11:
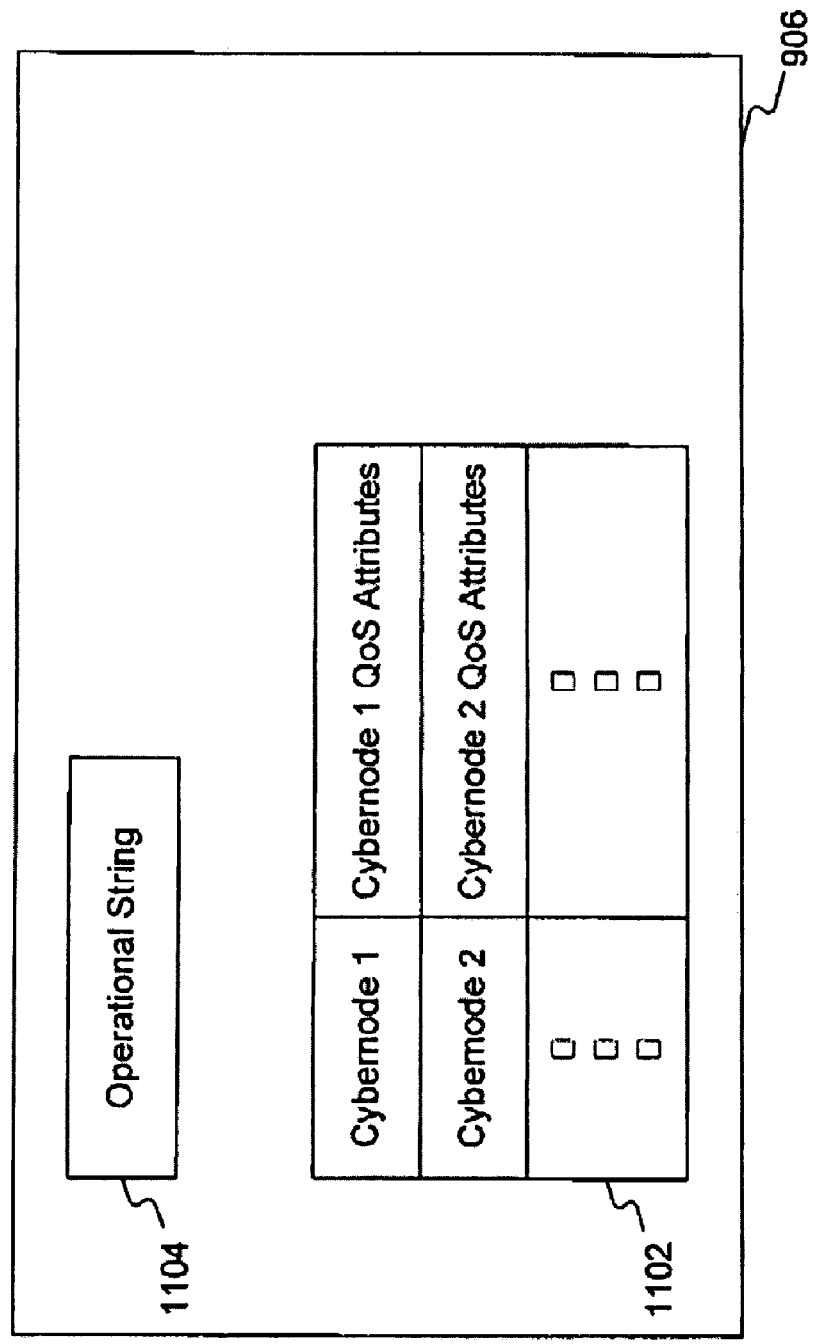
FIG. 11 is a block diagram of a service provisioner in greater detail, in accordance with the present invention.

FIG. 11 is a block diagram of a service provisioner in greater detail. Service provisioner 906 includes a list 1102 of available cybernodes running in the distributed system. For each available cybernode, the QoS attributes of its underlying compute resource are stored in list 1102. For example, if an available cybernode runs on a computer, then the QoS attributes stored in list 1102 might include the computers CPU speed or storage capacity. Service provisioner 406 also includes one or more operational strings 1104.

Figure 12:
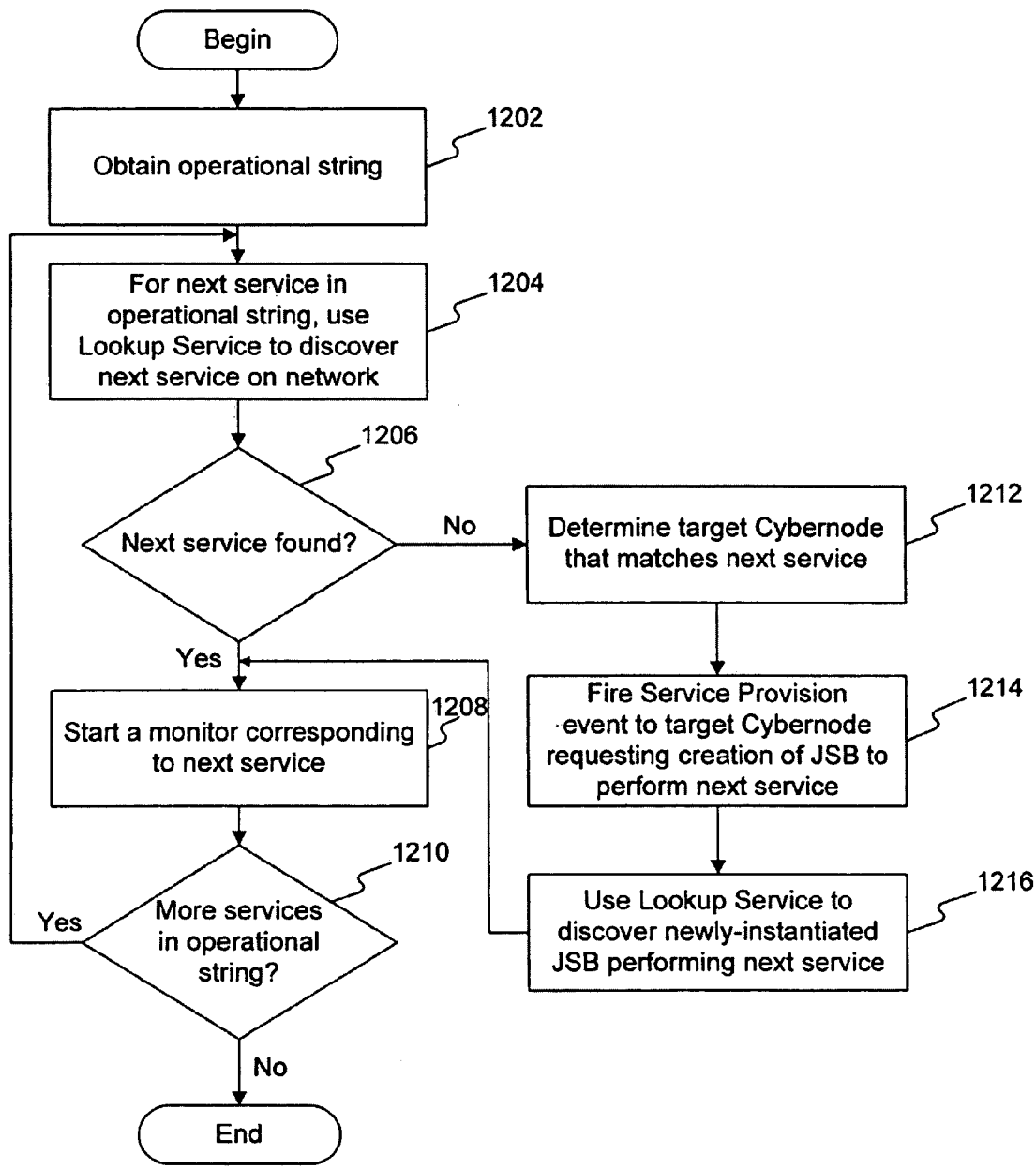
FIG. 12 is a flow chart of dynamic provisioning performed by a service provisioner, in accordance with the present invention.

FIG. 12 is a flow chart of dynamic provisioning performed by a service provisioner. Service provisioner 906 obtains an operational string consisting of any number of service elements (step 1202). The operational string may be, for example, operational string 502 or 504. Service provisioner 906 may obtain the operational string from, for example, a programmer wishing to establish a new service in a distributed system. For the first service in the operational string, service provisioner 906 uses a lookup service, such as lookup service 902, to discover whether an instance of the first service is running on the network (step 1204). If an instance of the first service is running on the network (step 1206), then service provisioner 906 starts a monitor corresponding to that service element (step 1208). The monitor detects, for example, when a service instance fails. If there are more services in the operational string (step 1210), then the process is repeated for the next service in the operational string.

If an instance of the next service is not running on the network (step 1206), then service provisioner 906 determines a target cybernode that matches the next service (step 1212). The process of matching a service instance to a cybernode is discussed below. Service provisioner 906 fires a service provision event to the target cybernode requesting creation of a JSB to perform the next service (step 1214). In one embodiment, the service provision event includes service bean attributes object 604 from service element 506. Service provisioner 906 then uses a lookup service to discover the newly instantiated JSB (step 1216) and starts a monitor corresponding to that JSB (step 1208).

Once a service instance is running, service provisioner 906 monitors it and directs its recovery if the service instance fails for any reason. For example, if a monitor detects that a service instance has failed, service provisioner 906 may issue a new service provision event to create a new JSB to provide the corresponding service. In one embodiment of the present invention, service provisioner 906 can monitor services that are provided by objects other than JSBs. The service provisioner therefore provides the ability to deal with damaged or failed resources while supporting a complex service.

Service provisioner 906 also ensures quality of service by distributing a service provision request to the compute resource best matched to the requirements of the service element. A service, such as a software component, has requirements, such as hardware requirements, response time, throughput, etc. In one embodiment of the present invention, a software component provides a specification of its requirements as part of its configuration. These requirements are embodied in service provision management object 602 of the corresponding service element. A compute resource may be, for example, a computer or a device, with capabilities such as CPU speed, disk space, connectivity capability, bandwidth, etc.

In one implementation consistent with the present invention, the matching of software component to compute resource follows the semantics of the Class.isAssignable( )method, a known method in the Java programming language. If the class or interface represented by QoS class object of the software component is either the same as, or is a superclass or superinterface of, the class or interface represented by the class parameter of the QoS class object of the compute resource, then a cybernode resident on the compute resource is invoked to instantiate a JSB for the software component. Consistent with the present invention, additional analysis of the compute resource may be performed before the "match" is complete. For example, further analysis may be conducted to determine the compute resource's capability to process an increased load or adhere to service level agreements required by the software component.

Enhanced Event Handling

Systems consistent with the present invention may expand upon traditional Jini event handling by employing flexible dispatch mechanisms selected by an event producer. When more than one event consumer has registered interest in an event, the event producer can use any policy it chooses for determining the order in which it notifies the event consumers. The notification policy can be, for example, round robin notification, in which the event consumers are notified in the order in which they registered interest in an event, beginning with the first event consumer that registered interest. For the next event notification, the round robin notification will begin with the second event consumer in the list and proceed in the same manner. Alternatively, an event producer could select a random order for notification, or it could reverse the order of notification with each event.

In an embodiment of the present invention, a service provisioner is an event producer and cybernodes register with it as event consumers. When the service provisioner needs to have a JSB instantiated to complete an operational string, the service provisioner fires a service provision event to all of the cybernodes that have registered, using an event notification scheme of its choosing.

Identification Service

Figure 13:
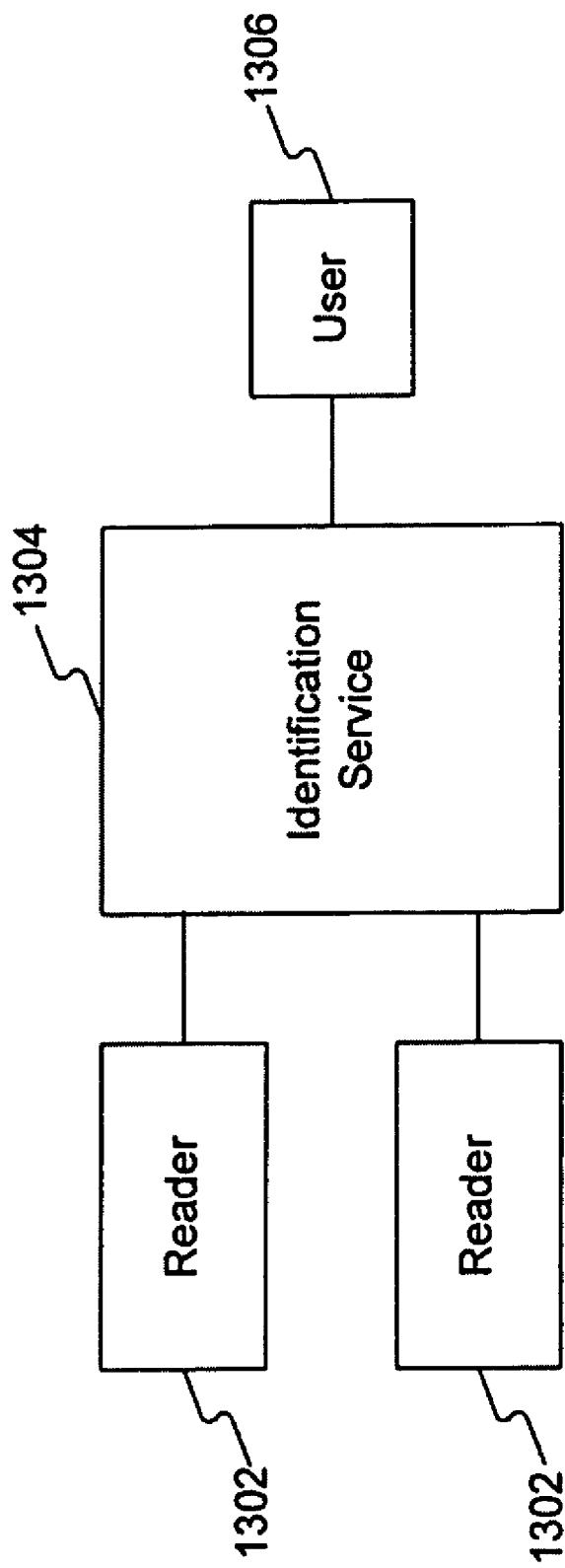
FIG. 13 is a block diagram of a system for providing an identification service, in accordance with the present invention.

FIG. 13 is a block diagram of one embodiment of the present invention that leverages the capabilities of the Jini and Rio systems to provide an identification service in a distributed network. One or more readers 1302 may detect and scan RFID tags that come within a predetermined range of a reader. The RFID tag may include data, including, for example, an electronic product code (EPC) identifying an item. The RFID data may also include, for example, a location of the reader, a data/time the tag was read, and an identifier of the reader. Reader 1302 may capture this data and transmit it to an identification service 1304, which may process the data and provide it to users 1306. Users 1306 may be, for example, client applications, web service applications, or databases that manage and store the processed data.

Readers 1302 may be, for example, any type of device that reads or senses data, such as identification data. For example, readers 1302 may be conventional RFID readers such as the Alien Nanoscanner Reader, the ThingMagic Mercury 3 RFID Reader, or the Matrics Advanced Reader. A large identification system may have hundreds or even thousands of readers, so readers 1302 are typically simple, inexpensive devices that perform only basic data processing. Identification service 1304 may provide extensive data processing to transform the largely untouched scanned data from readers 1302 into useful data customized to meet the preferences and requirements of individual users 1306. One skilled in the art will appreciate that the system of FIG. 13 may include any number of readers 1302, identification services 1304, and users 1306. Readers 1302 may also include devices that sense data, such as motion sensors, proximity sensors, or temperature sensors. Other types of devices may also be used without departing from the spirit and scope of the present invention.

Figure 14:
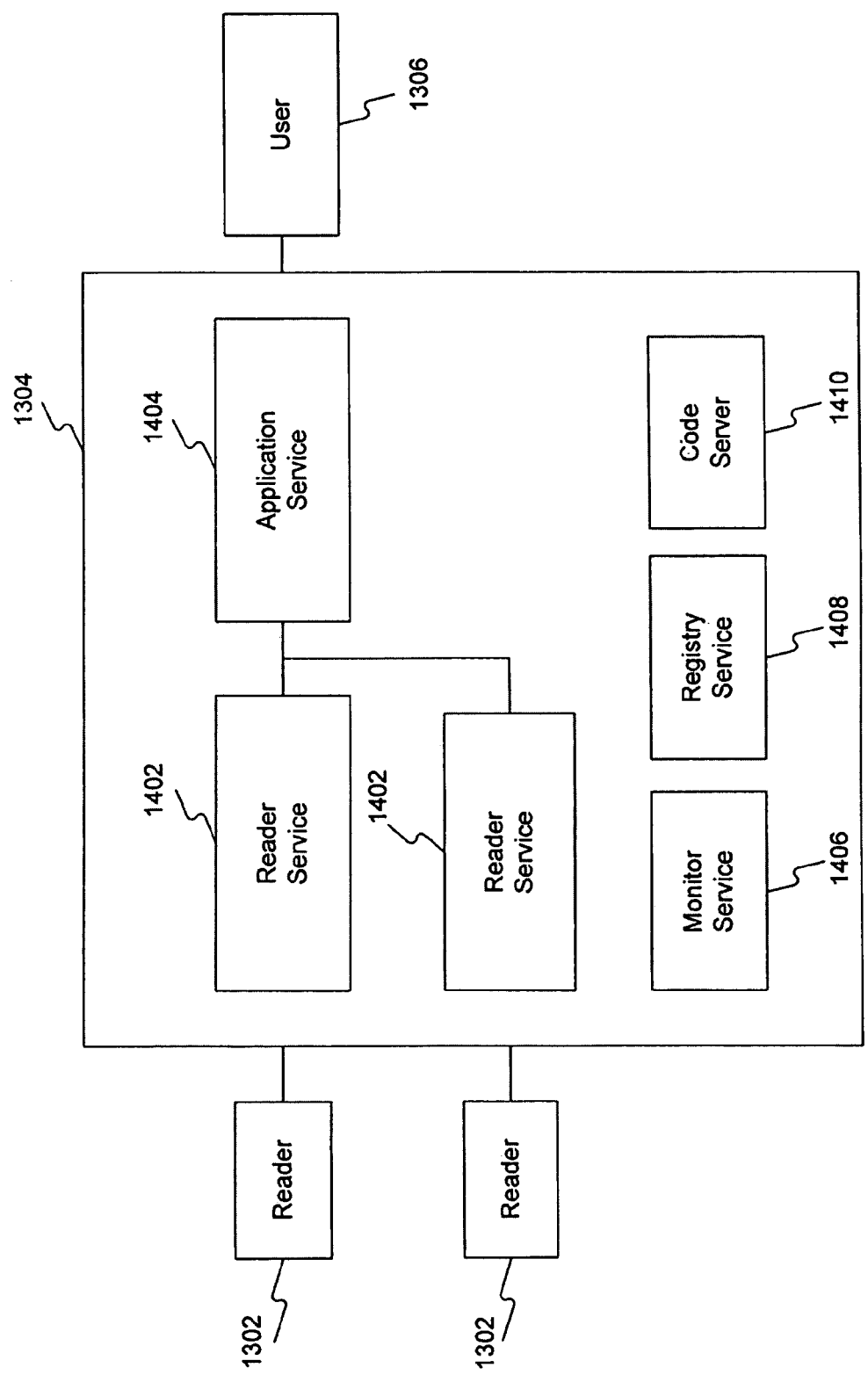
FIG. 14 is a block diagram of an identification service in greater detail, in accordance with the present invention.

FIG. 14 is a block diagram showing identification service 1304 in greater detail. As shown in FIG. 13, identification service 1304 may include components such as reader services 1402 and application service 1404. In one embodiment, reader services 1402 may include interfaces to control, manage, and secure devices such as readers 1302. In this embodiment, application service 1404 may include interfaces to customize data for and communicate with users 1306.

Identification service 1304 may also include a monitor service 1406, a registry service 1408, and a code server 1410 to support the provisioning of service components for identification service 1304. In one embodiment of the present invention, monitor service may be a Rio™ monitor implemented, for example, by service provisioner 906. As discussed above, a Rio™ monitor may detect when a service fails to ensure robust service provision. In this embodiment, registry service 1408 may be implemented as a Jini lookup service 212, described above, that enables services to establish communications with other services, and code server 1410 may be implemented as a code server 908, described above, that stores Java code files. Although FIG. 14 shows two reader services 1402, one application service 1404, one monitor service 1406, one registry service 1408, and one code server 1410, one skilled in the art will appreciate that identification service 1304 may have any number, including zero, of each of these components. In addition, readers 1302 may be adapted to run reader services 1402 and application service 1404 instead of identification service 1304.

Using the Rio architecture, identification service 1304 may be implemented using an operational string as described above. Service elements of the operational string may be reader service 1402 and application service 1404. In this way, monitor service 1406, registry service 1408, and code server 1410 may be used to provision and monitor identification service 1304 to ensure a robust and flexible distributed implementation.

Figure 15:
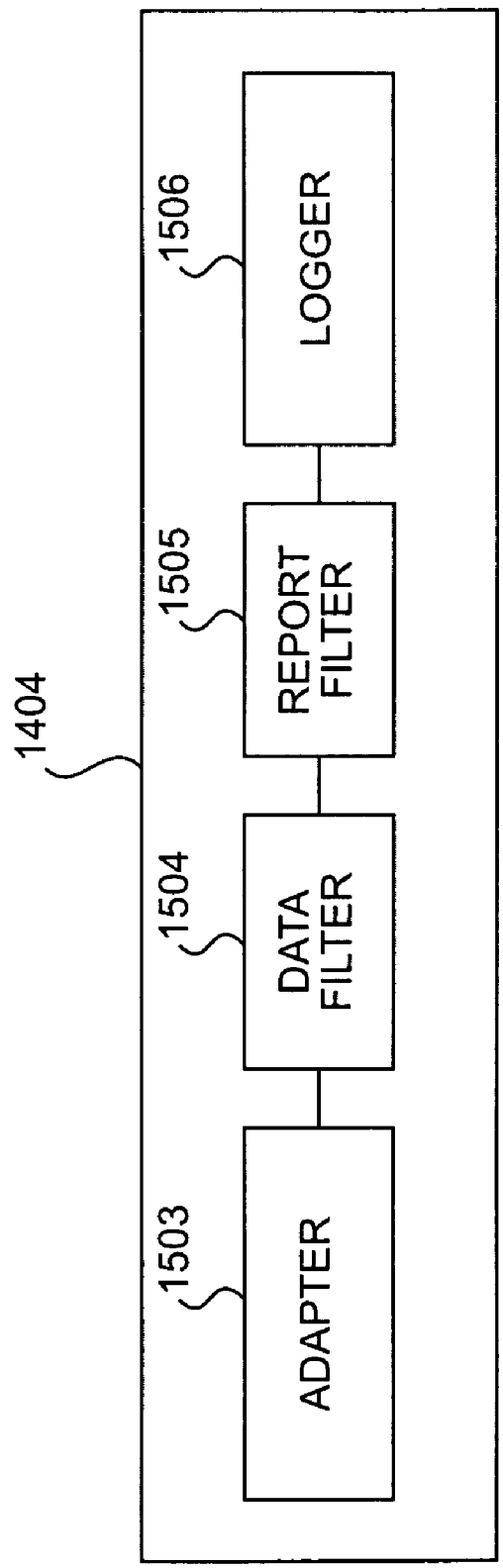
FIG. 15 is a block diagram of an application service in greater detail, in accordance with the present invention.

FIG. 15 is a block diagram of application service 1404 in greater detail. Application service 1404 may be implemented as a JSB and may include software components such as an adapter 1502, an event filter 1504, a report filter 1505, and a logger 1506. Although one adapter 1503 is shown, application service 1404 may include multiple adapters 1503, each one corresponding to a reader service 1402 receiving RFID data. Similarly, although one logger 1506 is shown, application service 1404 may include multiple loggers 1506, each one corresponding to a report subscription registered by a user 1306. Data filter 1504 may process the data received from adapter 1503, and logger 1506 may communicate the processed data to a user 1306. One skilled in the art will appreciate that these components may be linked together in the order shown or in any other order. In an alternative embodiment, reader service 1402 may include a queue (not pictured) as described below.

Application service 1404 may receive a report definition from users 1306. Users 1306 may use a web interface, such as an enterprise gateway (not shown) to generate report definitions and subscribe to reports generated by a report definition. For example, a user may define a report that provides notification of a number of items at a particular location, the location of a specific item, or the path an item has taken. A report definition derived from user input may be an XML based report definition. Based on criteria specified in an XML based report definition, one or more adapters 1502, data filter 1504, report filter 1505, and one or more loggers 1506 may be generated during run time.

Adapter 1503 may be, for example, a service element for interfacing with a reader service 1402. Adapter 1503 may receive RFID data from reader services 1402 as an event consumer using the enhanced event handling described above. This increases the feasibility and economy of identification service 1304. Adapter 1503 may function as an event listener (e.g., for data from readers) and/or an event producer (e.g., for data for a filter) using the enhanced event handling described above. An adapter may include a unique name, a Java class that implements the adapter, a set of properties, and a set of outputs. The properties may be, for example, a sequence of name value pairs that are passed to the adapter's constructor. The outputs may be, for example, a sequence of component names to be registered as event listeners to the adapter. The outputs may designate, for example, filter 1504, logger 1506, or a queue (not shown).

Criteria in a report definition may include reader identities, which may correspond to physical readers and/or logical readers. A logical reader identity may correspond to one or more physical reader identities. A user may wish to specify a logical reader when, for example, identities of physical readers are unknown or have been changed due to replacement. A logical reader identity may also be specified when it is possible to discern a physical location of an item by triangulating results from several physical readers. In such cases, a unique logical reader identity may correspond to each discernible location. Reader services 1402 may continually monitor registry service 1408 to discover physical and logical reader identities and maintain a list of discovered reader identities. Thus, application service 1404 may include one or more adapters 1503 for receiving RFID data from the reader services 1402 that support reader identities specified in a report definition.

Data filter 1504 may be used to process RFID data received from readers 1302. Data filter 1504 may include a unique name, a Java™ class that implements the filter, a set of properties, and a set of outputs. The properties may be, for example, a sequence of name value pairs that are passed to the filter's constructor. The outputs may be, for example, a sequence of component names that will be registered as event listeners to the filter. The outputs may designate, for example, report filter 1505.

Data filter 1504 may process RFID data received from reader 1302 based on criteria specified in a report definition (i.e., instructions), which may come from or on behalf of user 1306. Criteria specified in the report definition may include identification code patterns and external triggers. Identification code patterns may be used to include or exclude identification codes that match the specified identification code patterns. External triggers may include start and stop triggers for defining a period of time in which RFID data is collected (i.e., an "event cycle"). Alternatively, an event cycle may be defined by a start trigger and a duration. A report definition may specify start and stop triggers as Universal Resource Identifiers (URIs). Valid URIs may include Java Message Service (JMS) URIs, HTTP URIs, file URIs, and TCP URIs. A URI may specify an EPC pattern so that RFID data collection is triggered to start and/or stop upon detecting a match for the specified EPC pattern. An exemplary payload of a URI for a start trigger or a stop trigger may be an XML document such as, <Trigger fired="true"/> or <Trigger fired="false"/>. If a URI is not specified, a default may be to continually collect data until detection of a predetermined event.

RFID tags generate a much larger amount of data than traditional bar codes, much of which is often considered to be "noise," meaning that it is of little or no use. Therefore, in addition to filtering data specified in a report definition, data filter 1504 may be designed to automatically filter out data from mis-read RFID tags and noise. Such automatic filtering may increase the accuracy of the resulting data.

Data filter 1504 may link to report filter 1505 using the enhanced event handling described above. Like data filter 1504, report filter 1505 may include a unique name, a Java™ class that implements the filter, a set of properties, and a set of outputs. The properties may be, for example, a sequence of name value pairs that are passed to the filter's constructor. The outputs may be, for example, a sequence of component names that will be registered as event listeners to the filter. The outputs may designate, for example, other filters 1504, logger 1506, or queue (not shown).

The processed data received from data filter 1504 may be a list of RFID tags and a list of readers that produced the RFID tags. Therefore, report filter 1505 may organize the processed data according to criteria specified in a report definition. The criteria may include a report set definition and a report output definition. A report set definition may define a set of EPCs to be considered for reporting. For example, a set of reported EPCs may be all currently read EPCs, additions from a previous event cycle, or deletions from a previous event cycle. A report output definition may define whether to include a list of EPCs in the report and whether to calculate and include a total number of EPCs in the report.

Logger 1506 may be implemented to notify users 1306 of reports of data from readers 1302 and may function as an event listener (e.g., for data from filters) and/or an event producer (e.g., for data for users). Logger 1506 may also be configured to transmit reports to users 1306 of RFID and non-RFID events using a protocol specified by individual users 1306, for example, by logging information to a file system, a JMS queue, a TCP socket, or a XML/HTTP file. For example, when a user 1306 registers a report subscription, an appropriate logger 1506 may be created during run time and dynamically linked to report filter 1505. Similarly, when a report subscription is removed by a user 1306, the corresponding logger 1506 may be terminated and disconnected from report filter 1505. Logger 1506 may include, for example, a unique name, a Java™ class that implements the logger, and a set of properties. The properties may be, for example, a sequence of name value pairs that are passed to the logger's constructor.

A report definition specifying criteria for adapter 1503, data filter 1504, report filter 1505, and logger 1506 may be expressed using, for example, an XML document. The following is program code for an exemplary report definition written as an XML document:

```
<?xml version="1.0" encoding="UTF-8"?>
<ale:ECSpec xmlns:ale="urn:epcglobal:ale:xsd:1"
xmlns:epcglobal="urn:epcglobal:xsd:1"
xmlns:xsi="http://www.w3.org/2001/XMLSchema-instance"
xsi:schemaLocation="urn:epcglobal:ale:xsd:1 Ale.xsd"
schemaVersion="1.0"
creationDate="2003-08-06T10:54:06.444-05:00">
<logicalReaders>
<logicalReader>Dock Door1</logicalReader>
</logicalReaders>
<boundarySpec>
<startTrigger>urn:epc:pat:gid-96:*.*.*</startTrigger>
<duration unit="MS">60000</duration>
</boundarySpec>
<reportSpecS>
<reportSpec reportName="report1">
<reportSet set="CURRENT"/>
<output includeList="true"/>

</reportSpec>

<reportSpec reportName="report2">
<reportSet set="ADDITIONS"/>
<output includeCount="true"/>
</reportSpec>
</reportSpecs>
</ale:ECSpec>
```

In this exemplary code, the report definition is referred to as an Event Cycle Specification (ECSpec). The report definition above includes a section for specifying logical readers (e.g., "Dock Door 1"). The report definition also includes a section for specifying an event cycle temporal boundary (e.g., start trigger URI and duration of 60000 milliseconds). Finally, it includes a section for specifying data to be included in a report (e.g., ADDITIONS, meaning EPCs not read in a previous event cycle) and an indication to include a count of a total number of EPCs in the report.

Because adapter 1503, data filter 1504, report filter 1505, and logger 1506 may be implemented as event handler components, their component properties may be pre-configured with report definition criteria. In this manner, adapter 1503, data filter 1504, report filter 1505, and logger 1506 may be permanently associated with a particular reader 1302. The following is program code written as an XML document for an exemplary configuration file to support an application service 1404 permanently associated with a particular reader 1302:

```
<ems:adapter>
<ems:name>Matrics Reader</ems:name>
<ems:classname>com.sun.autoid.adapter.matrics.Matrics
Reader Adapter</ems:classn ame>
.
.
<ems:outputs>
<ems:output>ALE</ems:output>
</ems:outputs>
</ems:adapter>
<ems:filter>
<ems:name>ALE</ems:name>
<ems:classname>com.sun.autoid.ale.AleEventFilter</ems:classname>
<ems:properties>
<ems:property>LogLevel</ems:property>
<ems:value>CONFIG</ems:value>
</ems:properties>
<ems:properties>
<ems:property>startTrigger</ems:property>
<ems:value>urn:epc:pat:gid-96:*.*.*</ems:value>
</ems:properties>
<ems:properties>
<ems: property>duration</ems:property>
<ems:value>60000</ems:value>
</ems:properties>
<ems:outputs>
<ems:output>ALEReport</ems:output>
</ems:outputs>
</ems:filter>
<ems:filter>
<ems:name>ALEReport</ems:name>
<ems:classname>com.sun.autoid.ale.AleEventReport
Filter</ems:classna me>
<ems:properties>
<ems:property>LogLevel</ems:property>
<ems:value>CONFIG</ems:value>
</ems:properties>
<ems:properties>
<ems:property>ReportName</ems:property>
<ems:value>report1</ems:value>
</ems:properties>
<ems:properties>
<ems:property>ReportSet</ems:property>
<ems:value>CURRENT</ems:value>
</ems:properties>
<ems:properties>
<ems:property>OutputSpecIncludeList</ems:property>
<ems:value>true</ems:value>
</ems:properties>
<ems:outputs>
<ems:output>ALEOutput</ems:output>
</ems:outputs>
</ems:filter>
<ems:logger>
<ems:name>ALEOutput</ems:name>
```

```
<ems:classname>com.sun.autoid.ale.AleJMsReport
    Logger</ems:classna me>
<ems:properties>
    <ems:property>LogLevel</ems:property>
    <ems:value>CONFIG</ems:value>
</ems:properties>
<ems:properties>
    <ems:property>NotificationURI</ems:property>
    <ems:value>jms:/topic/com.sun.jndi.fscontext.R-
        efFSContextFactor y/epcis</ems:value>
</ems:properties>
</ems:logger>
```

In this exemplary code, the adapter section specifies a particular reader (e.g., Matrics Reader). The first filter section specifies report definition criteria for a data filter (e.g., a start trigger URI and a duration). The second filter section specifies report definition criteria for a report filter (e.g., CURRENT, meaning EPCs read in a current event cycle) and an indication to include a list of EPCs in the report. The logger section specifies a notification URI (e.g., a JMS queue).

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. Additional modifications and variations of the invention may be, for example, the described implementation includes software but the present invention may be implemented as a combination of hardware and software or in hardware alone. The invention may be implemented with both object-oriented and non-object-oriented programming systems.

For example, identification services consistent with the present invention may be implemented using, for example, the Java Management Extensions (JMX) technology to provide identification services that are accessible by management and monitoring applications. JMX Managed Beans may be created to implement components of the identification service and may be registered with a Jini lookup service. In this way, the JMX Managed Beans could be discovered and accessed by management applications. The JMX technology is described further at http://java.sun.com/products/Java-Management/. The JMX technology may be implemented, for example, using the Java Dynamic Management Kit (JDMK).

Identification services consistent with embodiments of the present invention may also be implemented using Simple Network Management Protocol (SNMP) Management Beans that may be accessible to network management systems such as Openview, Tivoli, and BMC Patrol. In this way, an identification service may be provided with unique management and monitoring capabilities.

Furthermore, one skilled in the art would recognize the ability to implement the present invention in many different situations. For example, the present invention can be applied to the telecommunications industry. A complex service, such as a telecommunications customer support system, may be represented as a collection of service elements such as customer service phone lines, routers to route calls to the appropriate customer service entity, and billing for customer services provided. The present invention could also be applied in any event processing system.

I claim:

1. A method comprising:
   dynamically creating, at a first computer resource of a distributed system, the first computer resource being configured as an identification service, an instance of a service element upon discovery of a reader in the distributed system, the service element comprising at least one of an adapter, a filter, and a logger, the reader operable to obtain identification data with at least one of a scanner and a sensor;
   receiving, by the filter, criteria in accordance with predetermined instructions;
   receiving, by the adapter, identification data from one or more readers identified by the criteria;
   providing the identification data from the adapter to the filter;
   processing the identification data by the filter, wherein the filter is a data filter for at least one of removing identification data which does not match the criteria and removing noise data from the identification data;
   providing notification, by the logger, of the processed data;
   monitoring the service element(s) to determine whether any service element fails; and
   re-establishing communication with the application corresponding to the service element,
   wherein the monitoring further comprises, for each of the service element(s), determining whether an application corresponding to the service element is running in the distributed system and creating the application corresponding to the service element, if the application corresponding to the service element is not running in the distributed system, and
   wherein at least one of the following is carried out using an event handling protocol wherein data is transmitted as an event: the receiving of the identification data, the providing of the identification data to the filter, and the providing the notification of the processed data.

2. The method of claim 1, wherein the processing further comprises:
   extracting an identification code from the identification data, and wherein the processed data includes the identification code.

3. The method of claim 2, wherein the identification code is an electronic product code (EPC).

4. The method of claim 1, wherein the reader comprises a Radio Frequency Identification (RFID) tag reader and the identification data represents RFID tag data.

5. The method of claim 1, wherein the criteria includes a start trigger definition and a stop trigger definition to define a period of time for processing the identification data by the filter.

6. The method of claim 5, wherein the start trigger definition includes a first identification data pattern that, if detected by the reader, signals the filter to start processing the identification data and the stop trigger definition includes a second identification data pattern that, if detected by the reader, signals the filter to stop processing the identification data.

7. The method of claim 1, wherein the adapter wirelessly receives the identification data from the readers through a wireless communication network.

8. A method comprising:
   dynamically creating, at a first computer resource of a distributed system, the first computer resource being configured as an identification service, an instance of a plurality of service elements upon discovery of a reader in the distributed system, the plurality of service elements comprising an adapter, a filter, and a logger, the reader operable to obtain identification data with at least one of a scanner and a sensor;

receiving, by the filter application, criteria specified by a user;

receiving, by the adapter application, identification information corresponding to an item from one or more readers identified in the criteria;

providing the identification information from the adapter application to the filter application;

processing the identification information by the filter application to create processed information including at least an identification code for the item, wherein the filter is a data filter for at least one of removing identification data which does not match the criteria and removing noise data from the identification data;

providing the processed information from the filter application to the logger application;

providing the processed information to a user by the logger application;

monitoring the applications corresponding to each service element to determine whether any application fails, wherein the monitoring further comprises, for each of the service element(s): determining whether an application corresponding to the service element is running in the distributed system and creating the application corresponding to the service element, if the application corresponding to the service element is not running in the distributed system; and re-establishing communication with the application corresponding to the service element, wherein at least one of the following is carried out using an event handling protocol wherein data is transmitted as an event: the receiving of the identification data, the providing of the identification data to the filter, and the providing the notification of the processed data.

9. The method of claim 8, wherein dynamically creating further includes:

downloading code for an application corresponding to each service element from a code server in the distributed system; and registering the application corresponding to each service element with a registry service in the distributed system.

10. The method of claim 8, wherein the identification information further includes at least one of: a location of the item, a time the identification information was read from the item, a date the identification information was read from the item, an identifier of the reader, and a location of the reader.

11. The method of claim 8, wherein the reader comprises a Radio Frequency Identification (RFID) tag reader.

12. The method of claim 8, wherein the identification code is an electronic product code (EPC).

13. The method of claim 8, further comprising: formatting the processed data based on the criteria.

14. The method of claim 8, wherein the adapter wirelessly receives the identification data from the readers through a wireless communication network.

15. A system comprising:

a first computer resource of a distributed system configured as an application service having service elements comprising:

an adapter that receives information from one or more readers in the distributed system based on predetermined criteria, a data filter that processes the identification information, wherein the data filter performs at least one of removes identification data which does not match the criteria and removes noise data from the identification data;

a logger that provides notification of the processed information, the logger storing processed information on a computer readable medium;

a registry service that establishes the application service and its service elements, the registry service dynamically creating an instance of a service element upon discovery of each reader in the distributed system, each reader operable to obtain identification data with at least one of a scanner and a sensor; and a monitor service that determines whether the reader service or any of its service elements fails, wherein the monitor service, for each of the service elements, determines whether an application corresponding to the service element is running in the distributed system and creates the application corresponding to the service element, if the application corresponding to the service element is not running in the distributed system, wherein, after the monitor service determines a failure of a reader service or any of its service elements, communication with the application corresponding to the service element is re-established, and wherein at least one of the following is carried out using an event handling protocol wherein data is transmitted as an event: the receiving of the identification data, the providing of the identification data to the filter, and the providing the notification of the processed data.

16. The system of claim 15, further comprising:

a code server containing code for use in establishing the application service and its service elements.

17. The system of claim 15, wherein the one or more readers are Radio Frequency Identification (RFID) tag readers.

18. The system of claim 15, wherein the one or more readers are configured to read the identification information from an item, and the identification information includes an identification code for the item.

19. The system of claim 18, wherein the identification code is an electronic product code (EPC).

20. The system of claim 15, wherein the user is an application.

21. The system of claim 15, wherein the application service further comprises a report filter for generating a report of the processed data based on the predetermined criteria.

22. The system of claim 21, further comprising a queue for holding the report generated by the report filter, wherein the logger provides notification of the processed information in an XML file transmitted to the queue.

23. The system of claim 15, wherein the predetermined criteria includes a poll request and the logger provides notification the user of the processed information in response to the poll request.

24. The method of claim 15, wherein the predetermined criteria includes a start trigger definition and a stop trigger definition to define a period of time for processing the identification data by the data filter.

25. The method of claim 24, wherein the start trigger and stop trigger are universal resource identifiers (URIs).

26. The method of claim 15, wherein the predetermined criteria identifies the one or more readers.

27. The method of claim 15, wherein the adapter receives the identification data from the readers through a wireless communication network.

* * * * *